(12) United States Patent
Tsukahara et al.

(10) Patent No.: US 11,115,561 B2
(45) Date of Patent: Sep. 7, 2021

(54) INCLINATION DETECTING DEVICE, READING DEVICE, IMAGE PROCESSING APPARATUS, AND METHOD OF DETECTING INCLINATION

(71) Applicants: Hajime Tsukahara, Kanagawa (JP); Hiroki Shirado, Kanagawa (JP); Ayumu Hashimoto, Kanagawa (JP); Yuuki Nakada, Kanagawa (JP); Tomohiko Ono, Kanagawa (JP); Tatsuya Ozaki, Kanagawa (JP); Hiroshi Kubo, Kanagawa (JP); Yoshiaki Nagao, Kanagawa (JP); Kimiharu Yanagisawa, Tokyo (JP); Masahiro Itoh, Kanagawa (JP)

(72) Inventors: Hajime Tsukahara, Kanagawa (JP); Hiroki Shirado, Kanagawa (JP); Ayumu Hashimoto, Kanagawa (JP); Yuuki Nakada, Kanagawa (JP); Tomohiko Ono, Kanagawa (JP); Tatsuya Ozaki, Kanagawa (JP); Hiroshi Kubo, Kanagawa (JP); Yoshiaki Nagao, Kanagawa (JP); Kimiharu Yanagisawa, Tokyo (JP); Masahiro Itoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/775,287

(22) Filed: Jan. 29, 2020

(65) Prior Publication Data
US 2020/0244837 A1    Jul. 30, 2020

(30) Foreign Application Priority Data
Jan. 30, 2019   (JP) .............................. JP2019-014659

(51) Int. Cl.
| H04N 1/04 | (2006.01) |
| H04N 1/387 | (2006.01) |
| H04N 1/047 | (2006.01) |

(52) U.S. Cl.
CPC .......... *H04N 1/3878* (2013.01); *H04N 1/047* (2013.01)

(58) Field of Classification Search
CPC .. H04N 1/3837; H04N 1/047; H04N 1/00681; H04N 1/00718; H04N 1/3878; H04N 1/04

(Continued)

(56) References Cited

U.S. PATENT DOCUMENTS

| 6,091,927 A | 7/2000 | Hattori et al. |
| 10,110,776 B2 * | 10/2018 | Sunada ................ H04N 1/3878 |

(Continued)

FOREIGN PATENT DOCUMENTS

| JP | 2000-349980 | 12/2000 |
| JP | 2017-092562 | 5/2017 |
| JP | 2017-112412 | 6/2017 |

OTHER PUBLICATIONS

Extended European Search Reported dated Jun. 24, 2020, issued in corresponding European Patent Application No. 20154006.9, 6 pages.

(Continued)

*Primary Examiner* — Cheukfan Lee
(74) *Attorney, Agent, or Firm* — Xsensus LLP

(57) ABSTRACT

An inclination detecting device includes processing circuitry. The processing circuitry is configured to detect, in image information that is an image of an object imaged by an imaging device at an imaging position where a background member forms a background, a first boundary between the background member and a shadow of the (Continued)

object; detect a second boundary between the object and the shadow of the object in the image information; and detect an inclination of the object in the image information from the first boundary and the second boundary detected by the processing circuitry.

15 Claims, 15 Drawing Sheets

(58) Field of Classification Search
USPC .............................. 358/488, 496, 498, 1.12
See application file for complete search history.

(56) References Cited

U.S. PATENT DOCUMENTS

| | | |
|---|---|---|
| 2002/0054374 A1 | 5/2002 | Inoue et al. |
| 2002/0109864 A1 | 8/2002 | Nishikino et al. |
| 2002/0114645 A1 | 8/2002 | Takahashi et al. |
| 2002/0191996 A1 | 12/2002 | Nishikino et al. |
| 2003/0049051 A1 | 3/2003 | Takahashi et al. |
| 2003/0095813 A1 | 5/2003 | Nishikino et al. |
| 2003/0103781 A1 | 6/2003 | Takahashi et al. |
| 2004/0004319 A1 | 1/2004 | Hattori et al. |
| 2005/0067944 A1 | 3/2005 | Masuda et al. |
| 2005/0095034 A1 | 5/2005 | Takahashi et al. |
| 2005/0179963 A1 | 8/2005 | Nagano et al. |
| 2005/0200737 A1 | 9/2005 | Shinohara et al. |
| 2007/0121176 A1 | 5/2007 | Yamazaki et al. |
| 2007/0216915 A1 | 9/2007 | Tsukahara |
| 2008/0024842 A1 | 1/2008 | Tsukahara et al. |
| 2008/0068467 A1 | 3/2008 | Kanno et al. |
| 2008/0106748 A1 | 5/2008 | Tsukahara et al. |
| 2008/0212146 A1 | 9/2008 | Tsukahara et al. |
| 2008/0218724 A1 | 9/2008 | Nishina et al. |
| 2008/0231917 A1 | 9/2008 | Tsukahara |
| 2008/0278779 A1 | 11/2008 | Nishina et al. |
| 2008/0297862 A1 | 12/2008 | Tsukahara |
| 2009/0015709 A1 | 1/2009 | Kimura et al. |
| 2009/0213440 A1 | 8/2009 | Nishina et al. |
| 2009/0237750 A1 | 9/2009 | Tatsuno et al. |
| 2009/0316039 A1 | 12/2009 | Yoshida et al. |
| 2009/0323139 A1 | 12/2009 | Itoh et al. |
| 2010/0007929 A1 | 1/2010 | Ono et al. |
| 2010/0020367 A1 | 1/2010 | Abe et al. |
| 2010/0027079 A1 | 2/2010 | Nishina et al. |
| 2010/0027081 A1 | 2/2010 | Sano et al. |
| 2010/0142009 A1 | 6/2010 | Tsukahara et al. |
| 2010/0214630 A1 | 8/2010 | Takaura et al. |
| 2010/0225983 A1 | 9/2010 | Fujii et al. |
| 2011/0026085 A1 | 2/2011 | Tsukahara et al. |
| 2011/0109945 A1 | 5/2011 | Tsukahara |
| 2011/0176186 A1* | 7/2011 | Kanaya ............... H04N 1/00753 358/498 |
| 2012/0002252 A1 | 1/2012 | Kubo et al. |
| 2012/0026550 A1 | 2/2012 | Tsukahara |
| 2012/0057210 A1 | 3/2012 | Tsukahara et al. |
| 2012/0057211 A1 | 3/2012 | Shirado |
| 2013/0215481 A1 | 8/2013 | Hayasaka et al. |
| 2013/0215482 A1 | 8/2013 | Takaura et al. |
| 2013/0242359 A1 | 9/2013 | Heishi et al. |
| 2013/0242362 A1 | 9/2013 | Nakayama et al. |
| 2013/0293932 A1 | 11/2013 | Sugai et al. |
| 2014/0043629 A1 | 2/2014 | Shirado |
| 2014/0043662 A1 | 2/2014 | Nakayama et al. |
| 2014/0071501 A1 | 3/2014 | Shinkawa et al. |
| 2014/0078560 A1 | 3/2014 | Nagao et al. |
| 2014/0093177 A1* | 4/2014 | Hayashi ............. H04N 1/00753 382/199 |
| 2014/0177012 A1 | 6/2014 | Kubo et al. |
| 2014/0376808 A1 | 12/2014 | Hashimoto |
| 2015/0092994 A1 | 4/2015 | Masuda et al. |
| 2015/0256701 A1 | 9/2015 | Kimura et al. |
| 2015/0264194 A1 | 9/2015 | Kubo et al. |
| 2015/0334273 A1 | 11/2015 | Yanagisawa et al. |
| 2015/0365553 A1 | 12/2015 | Sugai et al. |
| 2016/0028920 A1 | 1/2016 | Hashimoto |
| 2016/0119495 A1 | 4/2016 | Konno et al. |
| 2016/0170564 A1 | 6/2016 | Masuda et al. |
| 2016/0198059 A1 | 7/2016 | Kubo et al. |
| 2016/0219163 A1 | 7/2016 | Shirado et al. |
| 2017/0019547 A1 | 1/2017 | Ozaki |
| 2017/0019567 A1 | 1/2017 | Konno et al. |
| 2017/0126929 A1 | 5/2017 | Noro et al. |
| 2017/0171428 A1 | 6/2017 | Kawano et al. |
| 2017/0244853 A1 | 8/2017 | Yabuuchi et al. |
| 2017/0264782 A1 | 9/2017 | Hashimoto |
| 2017/0295298 A1 | 10/2017 | Ozaki et al. |
| 2017/0302821 A1 | 10/2017 | Sasa et al. |
| 2018/0048786 A1* | 2/2018 | Sunada ................ H04N 1/3878 |
| 2018/0139345 A1 | 5/2018 | Goh et al. |
| 2018/0146150 A1 | 5/2018 | Shirado et al. |
| 2018/0175096 A1 | 6/2018 | Inoue et al. |
| 2018/0213124 A1 | 7/2018 | Yokohama et al. |
| 2019/0180415 A1* | 6/2019 | Lee ........................ G06T 3/60 |
| 2019/0260892 A1 | 8/2019 | Kawai et al. |
| 2020/0120225 A1* | 4/2020 | Oyama .............. H04N 1/00708 |
| 2020/0137262 A1* | 4/2020 | Kubo ................. H04N 1/00588 |
| 2020/0244837 A1* | 7/2020 | Tsukahara .......... H04N 1/00092 |
| 2020/0296255 A1* | 9/2020 | Hashimoto ........ H04N 1/00748 |

OTHER PUBLICATIONS

U.S. Appl. No. 16/431,954, filed Jun. 5, 2019, Ayumu Hashimoto, et al.

U.S. Appl. No. 16/533,984, filed Aug. 7, 2019, Masamoto Nakazawa, et al.

U.S. Appl. No. 16/536,575, filed Aug. 9, 2019, Masamoto Nakazawa, et al.

U.S. Appl. No. 16/575,457, filed Sep. 19, 2019, Tomohiro Sasa, et al.

U.S. Appl. No. 16/589,258, filed Oct. 1, 2019, Tatsuya Ozaki, et al.

U.S. Appl. No. 16/589,329, filed Oct. 1, 2019, Tadaaki Oyama, et al.

U.S. Appl. No. 16/654,007, filed Oct. 16, 2019, Hiroshi Kubo, et al.

* cited by examiner

INCLINATION DETECTING DEVICE, READING DEVICE, IMAGE PROCESSING APPARATUS, AND METHOD OF DETECTING INCLINATION

CROSS-REFERENCE TO RELATED APPLICATION

This patent application is based on and claims priority pursuant to 35 U.S.C. § 119(a) to Japanese Patent Application No. 2019-014659, filed on Jan. 30, 2019, in the Japan Patent Office, the entire disclosure of which is hereby incorporated by reference herein.

BACKGROUND

Technical Field

The present disclosure relates to an inclination detecting device, a reading device, an image processing apparatus, and a method of detecting inclination.

Discussion of the Background Art

Conventionally, there has been known an electric skew correction technique for correcting, on the basis of a skew angle and a registration position detected from a read image of an automatic document feeder (ADF), document skew and main/sub misregistration at the time of ADF reading through image processing.

SUMMARY

In an aspect of the present disclosure, there is provided an inclination detecting device that includes processing circuitry. The processing circuitry is configured to detect, in image information that is an image of an object imaged by an imaging device at an imaging position where a background member forms a background, a first boundary between the background member and a shadow of the object; detect a second boundary between the object and the shadow of the object in the image information; and detect an inclination of the object in the image information from the first boundary and the second boundary detected by the processing circuitry.

In another aspect of the present disclosure, there is provided a reading device that includes an imaging device and processing circuitry. The imaging device is configured to image an object at an imaging position where a background member forms a background. The processing circuitry is configured to detect, in image information that is an image of the object imaged by the imaging device, a first boundary between the background member and a shadow of the object; detect a second boundary between the object and the shadow of the object in the image information; and detect an inclination of the object in the image information from the first boundary and the second boundary detected by the processing circuitry.

In still another aspect of the present disclosure, there is provided an image processing apparatus that includes the reading device and an image forming device configured to form an image on basis of the image information read by the reading device.

In still yet another aspect of the present disclosure, there is provided a method of detecting an inclination. The method includes first detecting, in image information that is an image of an object imaged by an imaging device at an imaging position where a background member forms a background, a first boundary between the background member and a shadow of the object; second detecting a second boundary between the object and the shadow of the object in the image information; and third detecting an inclination of the object in the image information from the first boundary detected by the first detecting and the second boundary detected by the second detecting.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
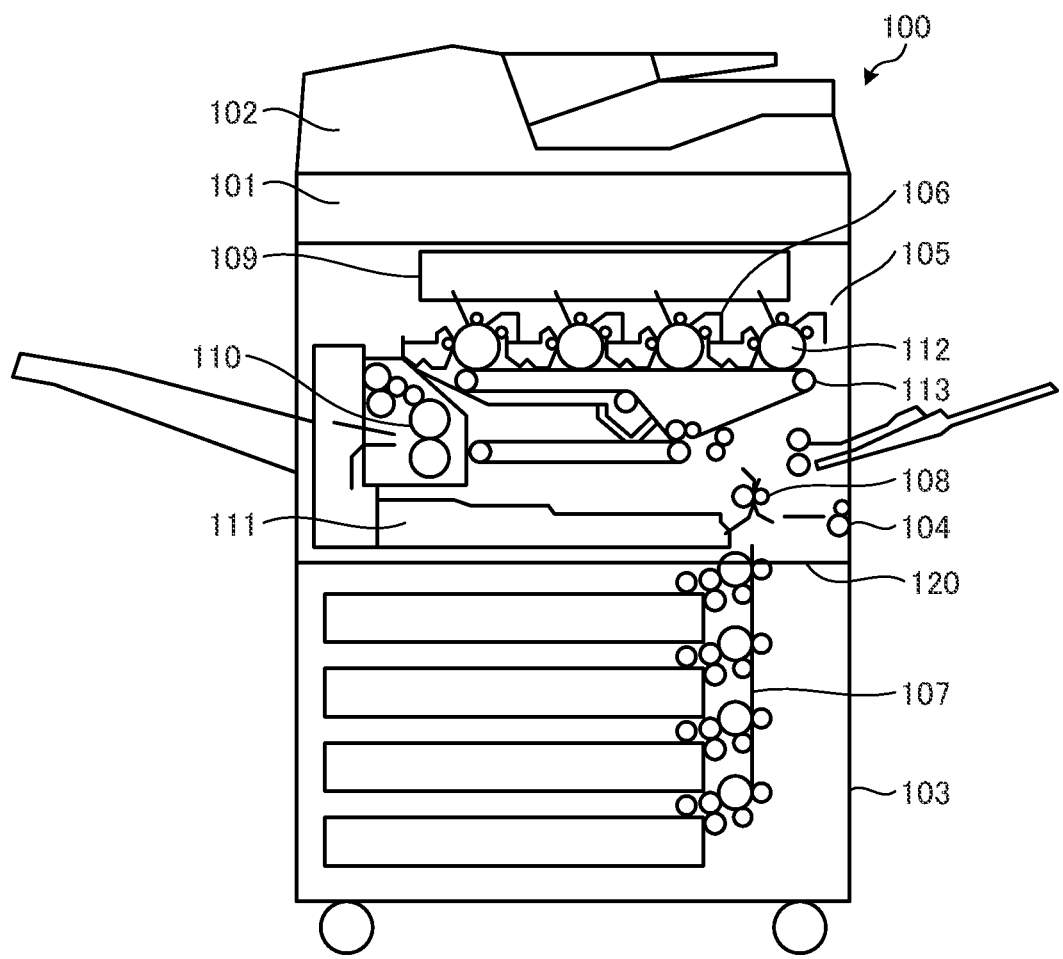
FIG. 1 is a cross-sectional view schematically illustrating a general configuration of an image processing apparatus according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of an inclination detecting device, a reading device, an image processing apparatus, and a method of detecting inclination will be described in detail with reference to the accompanying drawings.

First Embodiment

FIG. 1 is a cross-sectional view schematically illustrating a general configuration of an image processing apparatus 100 according to a first embodiment. The image processing apparatus 100 is a multifunction peripheral having at least two functions among a copy function, a printer function, a scanner function, and a facsimile function.

As illustrated in FIG. 1, the image processing apparatus 100 includes a sheet feeding device 103, an apparatus body 104, a scanner 101, and an automatic document feeder (ADF) 102.

The image processing apparatus 100 includes a plotter 120, which is an image forming device, inside the apparatus body 104. The plotter 120 includes an imaging device 105 of a tandem system, a registration roller 108 that supplies a recording sheet from the sheet feeding device 103 to the imaging device 105 via a conveyance path 107, an optical writing device 109, a fixing device 110, and a double-sided tray 111.

The imaging device 105 includes four photoconductor drums 112 corresponding to four colors of yellow (Y), magenta (M), cyan (C), and key plate (black) (K), which are arranged in parallel. Around each of the photoconductor drums 112, image formation elements including a charging device, a developing device 106, a transfer device, a cleaner, and a neutralizing device are disposed.

An intermediate transfer belt 113 stretched between a driving roller and a driven roller is disposed between the transfer device and the photoconductor drum 112 while being sandwiched between the nip of the two.

The image processing apparatus 100 of the tandem system having such a configuration performs, using the optical writing device 109, optical writing on the photoconductor drums 112 corresponding to the respective colors of Y, M, C, and K for each color on the basis of the document image obtained by reading the document as a detection target sent from the ADF 102 with the scanner 101, performs developing for each color toner using the developing device 106, and performs primary transfer on the intermediate transfer belt 113 in the order of Y, M, C, and K, for example. Then, the image processing apparatus 100 secondarily transfers the full-color image in which the four colors are superimposed based on the primary transfer onto a recording sheet supplied from the sheet feeding device 103, and then performs fixing using the fixing device 110 and performs sheet ejection, thereby forming a full-color image on the recording sheet.

Next, the scanner 101 will be described.

Figure 2:
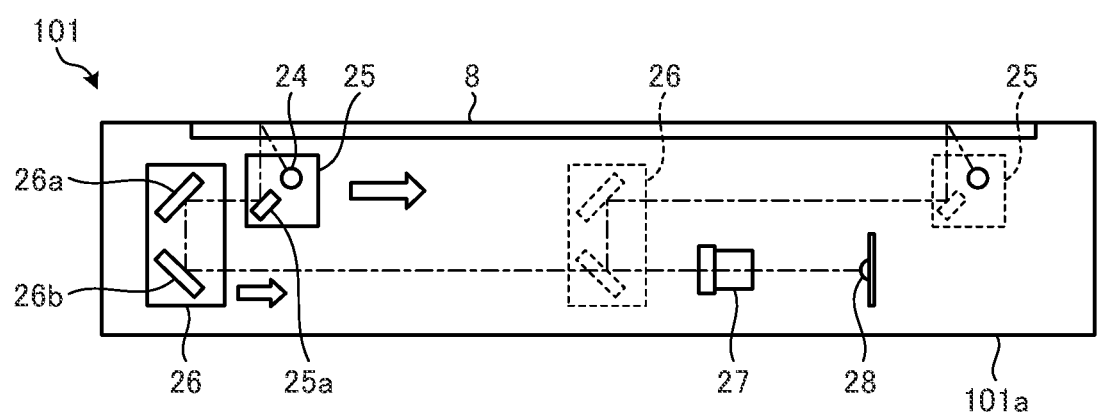
FIG. 2 is a cross-sectional view schematically illustrating a general configuration of a scanner.

FIG. 2 is a cross-sectional view schematically illustrating a general configuration of the scanner 101. As illustrated in FIG. 2, the scanner 101 includes a first carriage 25, a second carriage 26, an imaging lens 27, and an imaging device 28, and each of those components is disposed inside a body frame 101a of the scanner 101.

Furthermore, inside the body frame 101a of the scanner 101, a first rail and a second rail (not illustrated) are provided to extend in the sub-scanning direction (horizontal direction in FIG. 2). The first rail includes two rails disposed at a predetermined interval in the main-scanning direction orthogonal to the sub-scanning direction. The second rail also has a configuration similar to the configuration of the first rail.

The first carriage 25 is attached to the first rail in a slidable manner, and can be reciprocated between, in the sub-scanning direction, the position indicated by a solid line and the position indicated by a broken line in FIG. 2 via a first carriage drive wire (not illustrated) by a drive motor (not illustrated). The first carriage 25 includes a light source 24, and a first mirror member 25a.

The second carriage 26 is attached to the second rail in a slidable manner, and can be reciprocated between, in the sub-scanning direction, the position indicated by the solid line and the position indicated by the broken line in FIG. 2 via a second carriage drive wire (not illustrated) by a drive motor (not illustrated). The second carriage 26 includes a second mirror member 26a, and a third mirror member 26b.

Here, the first carriage 25 and the second carriage 26 move in the sub-scanning direction at a speed ratio of 2:1. Due to such a moving speed relationship, even if the first carriage 25 and the second carriage 26 move, the optical path length of light from the document surface to the imaging lens 27 does not change.

The imaging lens 27 condenses and images reflected light from the document entered through each mirror member on the imaging device 28. The imaging device 28 includes an imaging element such as a charge-coupled device (CCD), which photoelectrically converts the reflected light image of the document formed through the imaging lens 27, and outputs an analog image signal that is a read image.

Next, the ADF 102 to be mounted on the scanner 101 will be described.

Figure 3:
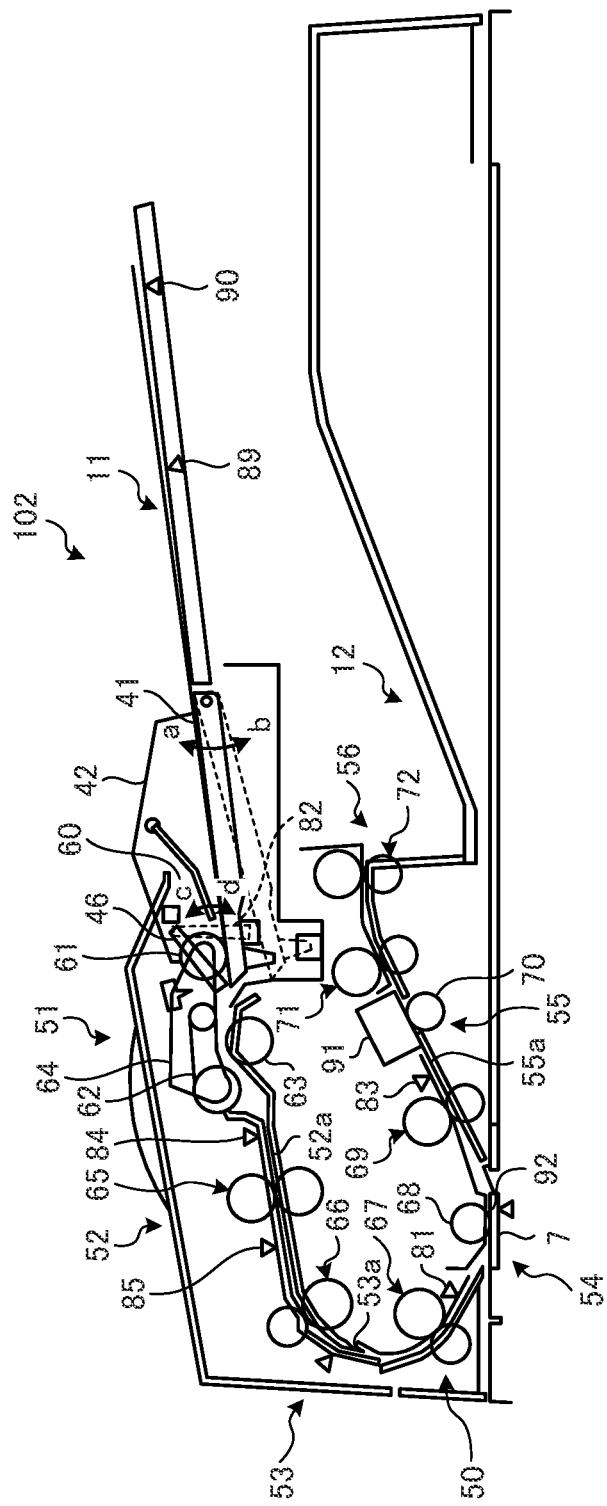
FIG. 3 is a cross-sectional view schematically illustrating a general configuration of an ADF.

FIG. 3 is a cross-sectional view schematically illustrating a general configuration of the ADF 102. As illustrated in FIG. 3, the ADF 102 includes a document tray 11 on which documents are to be placed. The document tray 11 includes a movable document table 41 that rotates in "a" and "b" directions in the drawing with a base end serving as a fulcrum, and a pair of side guide plates 42 that position in the horizontal direction with respect to the sheet feeding direction of the document. With the movable document table 41 rotating, the front end of the document in the feeding direction is adjusted to an appropriate height.

Further, the document tray 11 is provided with document length detection sensors 89 and 90 that detect whether the orientation of the document is portrait or landscape, which are separated in the feeding direction. Note that, as the document length detection sensors 89 and 90, a reflection type sensor that performs detection with an optical means without contact or a contact type actuator sensor may be used.

One side of the pair of side guide plates 42 is slidable in the horizontal direction with respect to the sheet feeding direction, and is configured in such a manner that documents of different sizes can be placed on the plates.

The fixed side of the pair of side guide plates 42 is provided with a set feeler 46 that is rotated by a document being placed. The set feeler 46 is provided with, at the lowermost part on the movement trajectory of the tip of the feeler, a document set sensor 82 that detects placement of the document on the document tray 11. That is, the document set sensor 82 detects whether there is a document set on the ADF 102 on the basis of whether or not the set feeler 46 has rotated to be removed from the document set sensor 82.

The ADF 102 includes a conveyer 50, which includes a separation feeder 51, a pull-out unit 52, a turn unit 53, a first reading conveyer 54, a second reading conveyer 55, and a sheet ejector 56. Each conveyance roller of the conveyer 50 is rotationally driven by one or more conveyance motors.

The separation feeder 51 includes a pickup roller 61 disposed in the vicinity of a sheet feeding port 60 for feeding a document, and a sheet feeding belt 62 and a reverse roller 63 disposed to face each other across a conveyance path.

The pickup roller 61 is supported by a supporting arm member 64 attached to the sheet feeding belt 62, and moves up and down in "c" and "d" directions in the drawing between, via a cam mechanism (not illustrated), a contact position for contacting a document bundle and a separated position away from the document bundle. The pickup roller 61 picks up several (ideally one) documents out of the documents stacked on the document tray 11 at the contact position.

The sheet feeding belt 62 rotates in the sheet feeding direction, and the reverse roller 63 rotates in the direction opposite to the sheet feeding direction. While the reverse roller 63 rotates in the reverse direction with respect to the sheet feeding belt 62 when the documents have been subject to multiple feeding, if the reverse roller 63 is in contact with the sheet feeding belt 62 or only one sheet of the document is being conveyed, it rotates together with the sheet feeding belt 62 due to the action of a torque limiter (not illustrated). As a result, multiple feeding of the documents is suppressed.

The pull-out unit 52 includes pull-out rollers 65, which include a pair of rollers disposed to sandwich a conveyance path 52*a*. The pull-out unit 52 performs primary abutting alignment (what is called skew correction) on the sent document according to the drive timing of the pull-out rollers 65 and the pickup roller 61, and pulls out and conveys the document after the alignment.

The turn unit 53 includes intermediate rollers 66 and reading entrance rollers 67, which include a pair of rollers disposed to sandwich a conveyance path 53*a* curved from the top to the bottom. The turn unit 53 turns the document drawn and conveyed by the intermediate rollers 66 by conveying it on the curved conveyance path, and conveys the document to, using the reading entrance rollers 67, the vicinity of slit glass 7 that is a document reading position (imaging position) with the front face of the document facing downward.

Here, the conveyance speed of the document from the pull-out unit 52 to the turn unit 53 is set to be higher than the conveyance speed of the first reading conveyer 54. Accordingly, the conveyance time of the document conveyed to the first reading conveyer 54 is shortened.

The first reading conveyer 54 includes a first reading roller 68 disposed to face the slit glass 7, and first reading exit rollers 69 disposed on a conveyance path 55*a* after the reading is complete. The first reading conveyer 54 conveys, using the first reading roller 68, the document conveyed to the vicinity of the slit glass 7 with the front face of the document being brought into contact with the slit glass 7. At this time, the document is read by the scanner 101 through the slit glass 7. At this time, the first carriage 25 and the second carriage 26 of the scanner 101 are stopped at the home position. The first reading conveyer 54 further conveys the document after the reading is complete using the first reading exit rollers 69.

Figure 4:
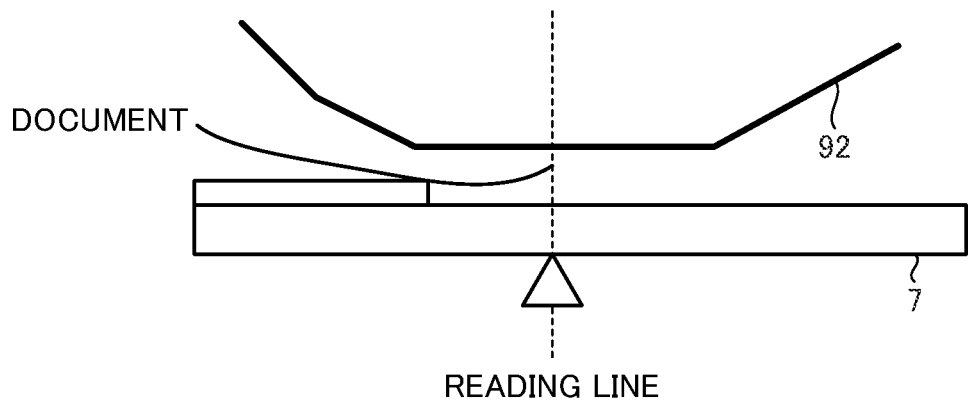
FIG. 4 is a diagram schematically illustrating a configuration in the vicinity of a document reading position.

Here, FIG. 4 is a diagram schematically illustrating a configuration in the vicinity of the document reading position. Note that the document is conveyed from left to right in FIG. 4.

As illustrated in FIG. 4, the ADF 102 includes a background member 92 to be an imaging background at a position facing the slit glass 7. The background member 92 is white, for example, and is used for shading correction. The document is conveyed between the slit glass 7 and the background member 92. The scanner 101 reads an image at the position of the reading line illustrated in FIG. 4.

The second reading conveyer 55 includes a second reader 91 that reads a back side of the document, a second reading roller 70 disposed to face the second reader 91 across the conveyance path 55*a*, and second reading exit rollers 71 disposed on the downstream side of the second reader 91.

The second reader 91 in the second reading conveyer 55 reads the back side of the document whose front face has been read. The document whose back side has been read is conveyed toward a sheet ejection port by the second reading exit rollers 71. The second reading roller 70 suppresses floating of the document in the second reader 91, and also serves as a white reference part for obtaining shading data in the second reader 91. In the case of not performing duplex reading, the document passes through the second reader 91.

The sheet ejector 56 includes an ejection roller pair 72 in the vicinity of the sheet ejection port, and ejects the document conveyed by the second reading exit rollers 71 onto an ejection tray 12.

Furthermore, the ADF 102 includes various sensors such as an abutment sensor 84, a registration sensor 81, and a sheet ejection sensor 83 along the conveyance path, which are used for conveyance control such as a conveyance distance and a conveyance speed of the document.

A document width sensor 85 is further provided between the pull-out rollers 65 and the intermediate rollers 66. Note that the length of the document in the conveyance direction is detected from the motor pulse by reading of the front end and the rear end of the document with the abutment sensor 84 and the registration sensor 81.

Next, a hardware configuration of the image processing apparatus 100 will be described.

Figure 5:
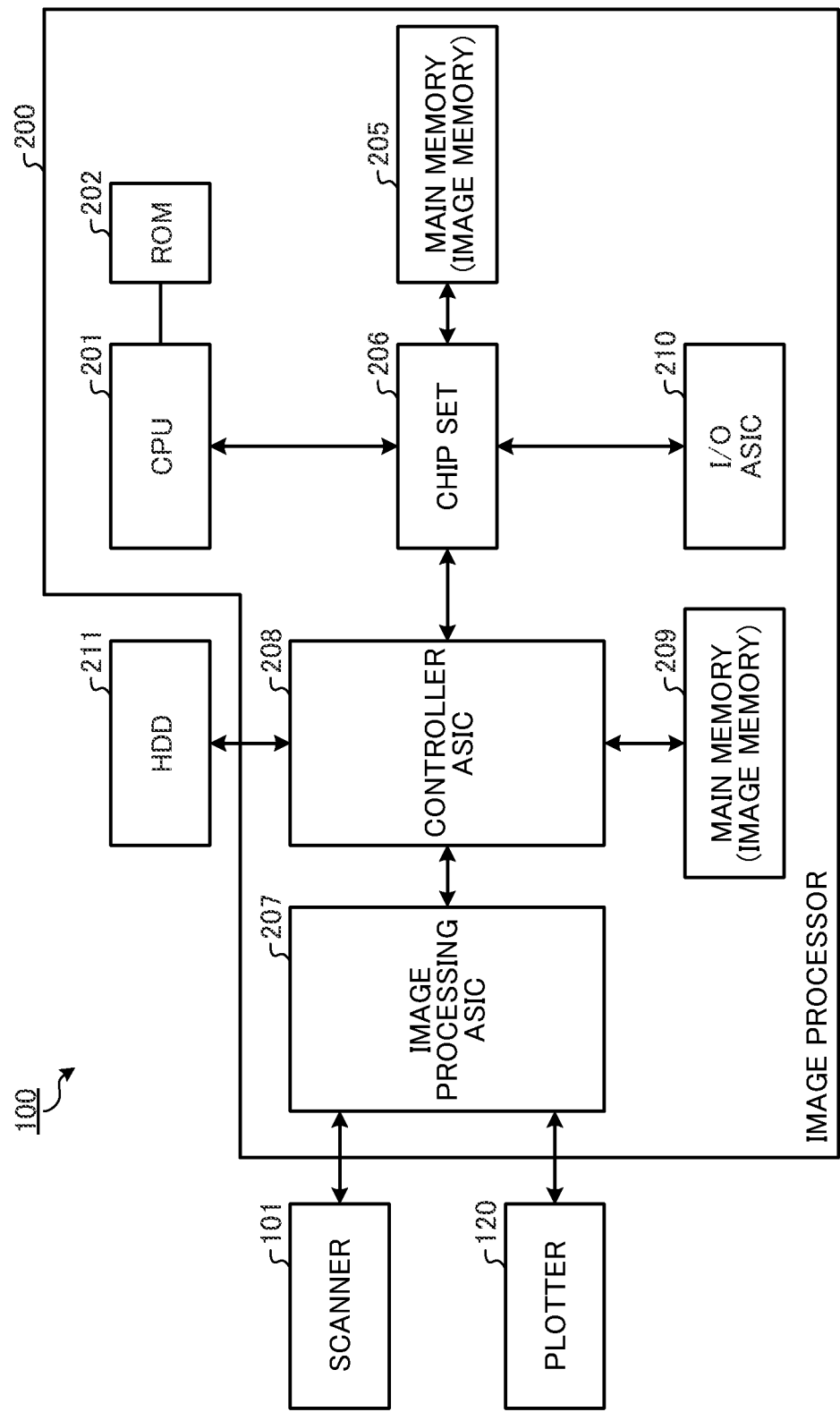
FIG. 5 is a block diagram illustrating a hardware configuration of the image processing apparatus.

Here, FIG. 5 is a block diagram illustrating the hardware configuration of the image processing apparatus 100. As illustrated in FIG. 5, the image processing apparatus 100 includes an image processor 200 that performs a predetermined process on the document image read by the scanner 101 and outputs it to the plotter 120 as image data. The scanner 101, the ADF 102, and the image processor 200 are included in an inclination detecting device and a reading device.

The image processor 200 includes a central processing unit (CPU) 201, a read only memory (ROM) 202, a main memory 205, a chip set 206, an image processing ASIC 207, a controller ASIC 208, a main memory 209, and an input/output (I/O) ASIC 210. Note that ASIC is an abbreviation of an application-specific integrated circuit.

The CPU 201 is for controlling the image processing apparatus 100. The main memory 205 is used as a work area in which a program for the CPU 201 to control the image processing apparatus 100 is loaded, or temporarily stores image data to be handled (image memory). The chip set 206 is used together with the CPU 201 to control the controller ASIC 208 and the I/O ASIC 210 accessing the main memory 205.

The program to be executed by the image processing apparatus 100 according to the present embodiment may be provided in such a state of being recorded in a computer readable recording medium, such as a compact disc read only memory (CD-ROM), a flexible disk (FD), a compact disc-recordable (CD-R), and a digital versatile disk (DVD), as a file in an installable format or an executable format.

Further, the program to be executed by the image processing apparatus 100 according to the present embodiment may be provided in such a state of being stored in a computer connected to a network, such as the Internet, and being downloaded via the network. Furthermore, the program to be executed by the image processing apparatus 100 according to the present embodiment may be provided or distributed via a network, such as the Internet.

The scanner 101 has a function of reading image data to be copied and image data to be output to an external interface. The plotter 120 has a function for printing image data having been subject to image processing performed by the controller ASIC 208.

The image processing ASIC 207 performs image processing on the image data read by the scanner 101, and outputs image data to the controller ASIC 208. Further, the image processing ASIC 207 performs image processing so that the image data from the controller ASIC 208 can be printed by the plotter 120, and transmits image data according to the printing timing of the plotter 120.

The controller ASIC 208 uses the main memory 205 over the chip set 206 to rotate and edit the image data handled by the image processing apparatus 100, accumulates the image data in an HDD 211, and exchanges the image data with the image processing ASIC 207. The main memory 209 is used as an image memory for the controller ASIC 208 to perform image processing. The hard disk drive (HDD) 211 is used to temporarily store image data having been subject to image processing.

The I/O ASIC 210 is an external interface for giving an additional function to the image processing apparatus 100. For example, the I/O ASIC 210 includes an interface, such as a network interface, a universal serial bus (USB), a secure digital (SD) card, an operation device, a serial peripheral interface (SPI), an inter-integrated circuit (I2C), and the document width sensor 85, a hardware accelerator for speeding up image processing, an encryption processing circuit, and the like.

Next, functions to be exerted by the image processor 200 will be described.

Figure 6:
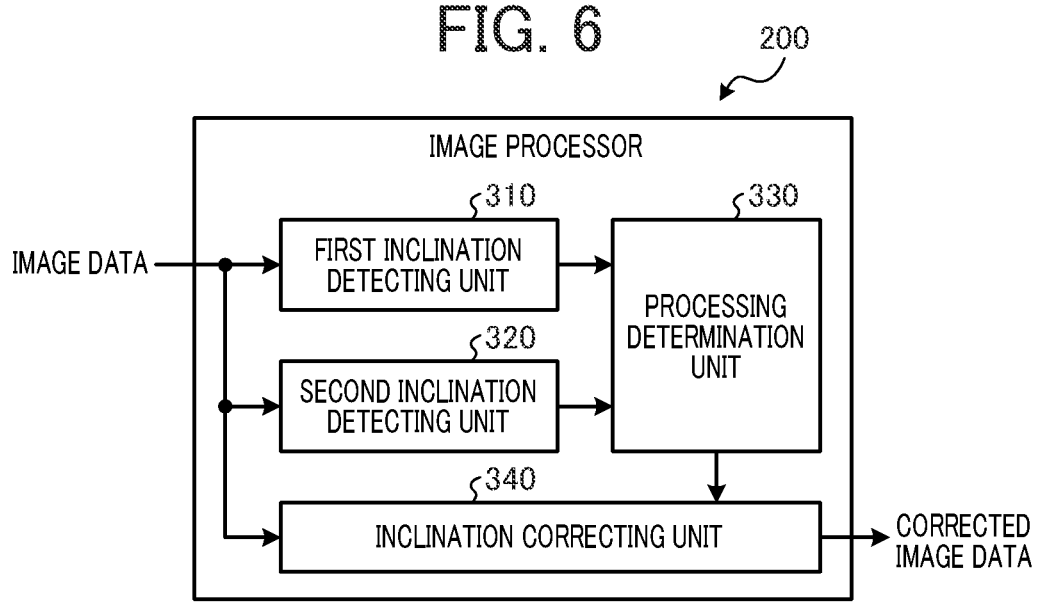
FIG. 6 is a block diagram illustrating functions of an image processor.

Here, FIG. 6 is a block diagram illustrating the functions of the image processor 200. Note that characteristic functions in the present embodiment will be described here among the functions to be exerted by the image processor 200.

As illustrated in FIG. 6, the image processor 200 includes an image generating unit 300, a first inclination detecting unit 310 that functions as a first boundary detecting unit, a second inclination detecting unit 320 that functions as a second boundary detecting unit, a processing determination unit 330, and an inclination correcting unit 340 that functions as an inclination detecting unit. In the present embodiment, the image processing ASIC 207 includes the image generating unit 300, and the controller ASIC 208 includes the first inclination detecting unit 310, the second inclination detecting unit 320, the processing determination unit 330, and the inclination correcting unit 340. Note that the present disclosure is not limited to the above, and the CPU 201 may execute a program to implement the first inclination detecting unit 310, the second inclination detecting unit 320, the processing determination unit 330, and the inclination correcting unit 340.

The image generating unit 300 generates digital image data (hereinafter referred to as image data) that is image information on the basis of analog image signals obtained by reading, with the imaging device 28, reflected light of the light emitted to the document passing through the slit glass 7 that is the document reading position (imaging position).

Figure 7:
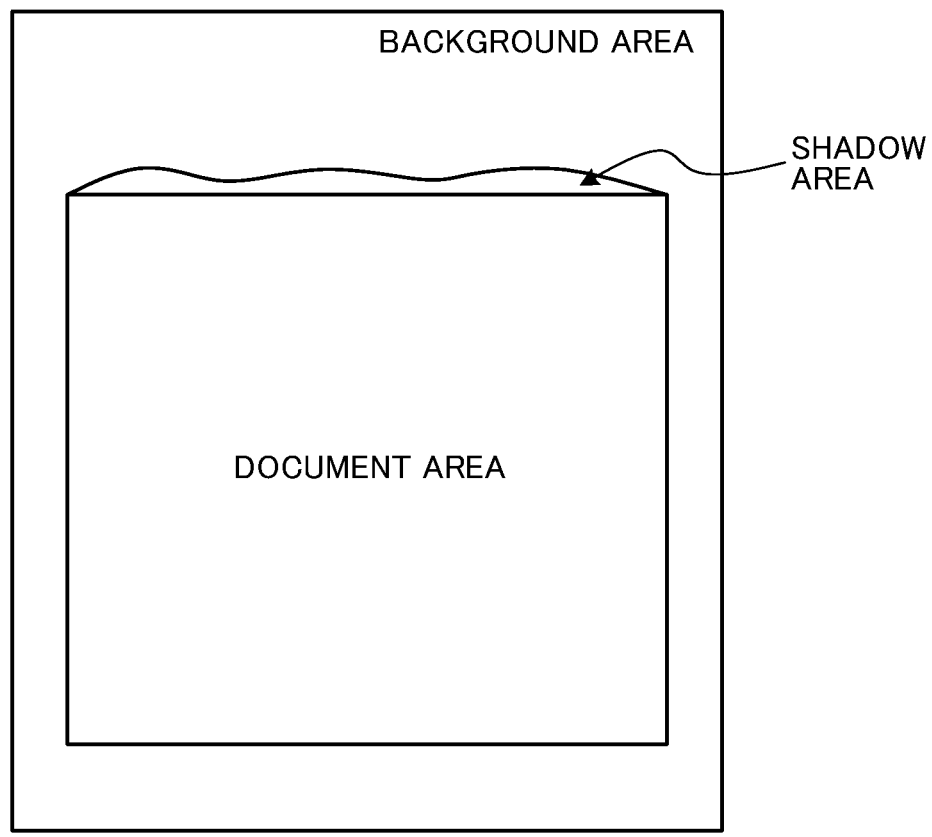
FIG. 7 is a diagram illustrating exemplary image data.

Here, FIG. 7 is a diagram illustrating exemplary image data.

As illustrated in FIG. 7, in the image data, a shadow area occurs at the boundary between the background area and the document area. In the case where the background member 92 is white, a shadow appears inevitably. Note that, although the shadow area is illustrated only on the upper side in FIG. 7, the shadow area occurs on the entire outline of the document.

If the distance between the document and the background member 92 is constant in the main-scanning direction, the width of the shadow area is uniform in the main-scanning direction. However, the width of the shadow area in the image data varies depending on the distance between the document and the background member 92. The shadow area in FIG. 7 illustrates an exemplary case where curl, a fold, or the like occurs at the edge of the document and variation occurs at the document edge so that the shadow width does not become uniform. For example, in a case where the document is on the upper side, that is, on the side of the background member 92, the width of the shadow area is narrower. On the other hand, in a case where the document is on the lower side, that is, on the side of the slit glass 7, the width of the shadow area is wider.

The first inclination detecting unit 310 detects the inclination amount of the document (skew amount) from a result of detection of the boundary between the background member 92 and the document shadow (shadow edge of the document) at a part of or all of the outline of the document in the image data in the main-scanning direction.

In the present embodiment, the first inclination detecting unit 310 detects the boundary between the background member 92 and the document shadow on the upper side, and detects the inclination amount of the document from a result of the detection of the boundary.

As described above, if the shadow width is uniform in the main-scanning direction, the inclination amount can be accurately detected from the detection result of the first inclination detecting unit 310. However, in a case where curl, a fold, or the like occurs at the edge of the document, the shadow width of the main scanning is not uniform, and an error based on the influence of the shadow width variation occurs in the inclination amount detection result of the first inclination detecting unit 310.

In view of the above, the second inclination detecting unit 320 detects the boundary between the document shadow and the document (document edge) from a part of or all of the outline of the document in the image data in the main-scanning direction, and detects the inclination amount of the document from the detection result of the boundary.

In the present embodiment, the second inclination detecting unit 320 detects the inclination amount of the document from the detection result of the boundary between the document shadow and the document on the upper side in the image data.

For example, stability of the outline in the main-scanning direction and the outline in the sub-scanning direction differs depending on the device configuration of the scanner 101. In a case where the stability of the outline in the main-scanning direction is high, accuracy in the detection can be improved by the inclination amount being detected only from the outline in the main-scanning direction.

Figure 8:
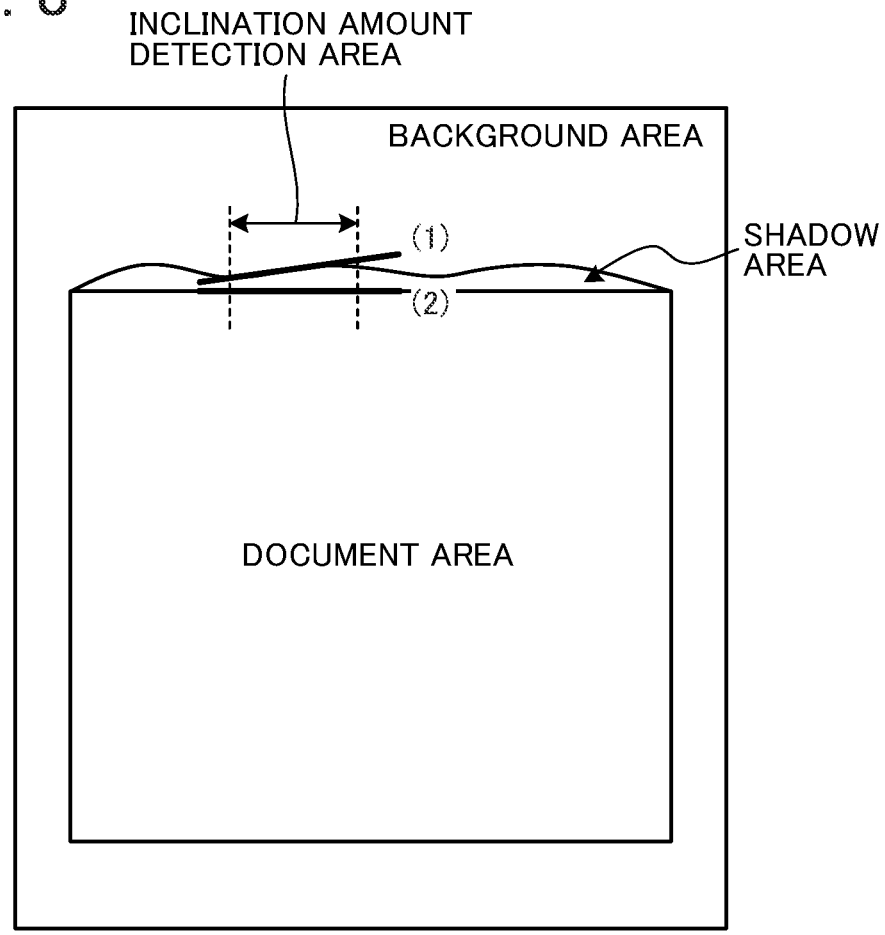
FIG. 8 is a diagram illustrating exemplary inclination amount detection from image data.

Here, FIG. 8 is a diagram illustrating exemplary inclination amount detection from image data. FIG. 8 illustrates an inclination amount detection result (1) of the first inclination detecting unit 310 and an inclination amount detection result (2) of the second inclination detecting unit 320 in the case where the width of the shadow area varies.

As illustrated in FIG. 8, the inclination amount detection result (1) of the first inclination detecting unit 310 shows that the distance between the document and the background member 92 varies in the main-scanning direction of the document, whereby the shadow is not uniform in the main-scanning direction of the document and variation in the shadow width occurs. Even in such a case, the inclination amount detection result (2) of the second inclination detecting unit 320 shows an inclination amount close to the outline of the document although an error is included. Accordingly, by taking the absolute value of the inclination amount (1) and the inclination amount (2), for example, it becomes possible to detect whether there is variation such as curl and a fold at the edge of the document.

The processing determination unit 330 determines a process to be performed on the image data from the inclination amount calculated by the first inclination detecting unit 310 and the second inclination detecting unit 320.

The inclination correcting unit 340 performs the image processing determined by the processing determination unit 330 to detect the inclination of the document in the image data, corrects the detected inclination, and outputs the corrected image data to the subsequent stage.

Here, exemplary determination of the process to be performed on the image data, which is determined by the processing determination unit 330, will be described as an example.

Exemplary Process Determination 1

For example, in a case where the absolute value of (1)-(2) is equal to or more than a predetermined value, the processing determination unit 330 notifies the inclination correcting unit 340 of a command not to perform correction. In this case, the inclination correcting unit 340 does not correct the inclination amount. Accordingly, it becomes possible to suppress erroneous correction in the case where the document has curl, a fold, or the like.

On the other hand, in a case where the absolute value of (1)-(2) is equal to or less than the predetermined value, the processing determination unit 330 notifies the inclination correcting unit 340 of a command to perform correction with the inclination amount detection result (2) of the second inclination detecting unit 320. In this case, the inclination correcting unit 340 performs correction with the inclination amount (2).

As described above, it becomes possible to provide, for all documents, a function of correcting the inclination amount without performing erroneous correction.

Exemplary Process Determination 2

For example, regardless of the difference between (1) and (2), the processing determination unit 330 notifies the inclination correcting unit 340 of a command to perform correction with the inclination amount detection result (2) of the second inclination detecting unit 320. In this case, the inclination correcting unit 340 performs correction with the inclination amount (2). Accordingly, it becomes possible to correct the inclination while minimizing the erroneous correction even in the case where the document has curl, a fold, or the like.

Here, the purpose of obtaining the inclination amount detection result (1) of the first inclination detecting unit 310 is not to detect information in the image area as the inclination amount (2). In this case, outline information detected within a predetermined number of lines of the sub-scanning from the detection position of the inclination amount (1) is used to generate the inclination amount (2).

As described above, it becomes possible to provide, for all documents, a function of correcting the inclination amount without performing erroneous correction.

Exemplary Process Determination 3

Although the detection result of the boundary between the document shadow and the document includes an error regardless of the state of the document, the outline can be detected accurately. However, in a case where the state of curl, a fold, or the like of the document is large, an error in the outline detection result of the document may be large. In view of the above, for example, by determining the correction amount from the difference (1)-(2) in FIG. 8 and the inclination amount (2), the processing determination unit 330 is made possible to perform correction with high accuracy even for a highly damaged document.

The following formula can be given as an exemplary arithmetic expression.

$$\text{Correction amount} = |\text{inclination amount (1)} - \text{inclination amount (2)}| \times (1/\alpha) + \text{inclination amount (2)}$$
$$\alpha = \text{fixed value or coefficient determined from (1)-(2)}$$

This makes it possible to perform highly accurate inclination correction while minimizing erroneous correction even in a case where the document has curl, a fold, or the like.

Figure 9:
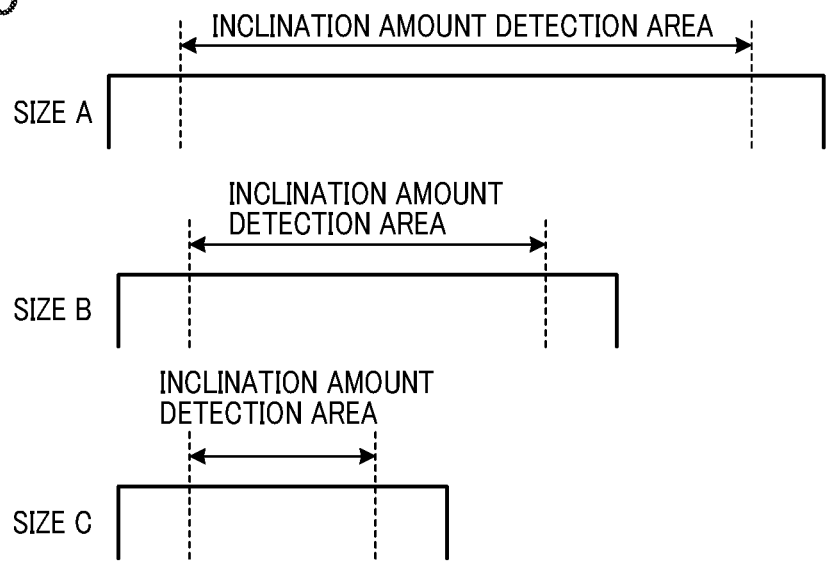
FIG. 9 is a diagram illustrating exemplary switching of an inclination amount detection area for each document size.

Note that, in FIG. 8, the inclination amount detection area (boundary detection area) in the first inclination detecting unit 310 and the second inclination detecting unit 320 may be set to any width. Here, FIG. 9 is a diagram illustrating exemplary switching of the inclination amount detection area for each document size. The detection area of the optimum inclination amount varies depending on the configuration of the scanner 101. In general, disturbance factors can be reduced by the inclination amount detection area being widened. Accordingly, as illustrated in FIG. 9, the inclination amount detection area is widened in the case where the document size is large, and the inclination amount detection area is narrowed in the case where the document size is small, whereby optimum detection performance can be obtained.

Furthermore, the position of the document area in the sub-scanning direction can be detected from the inclination amount detection result (2) of the second inclination detecting unit 320.

As described above, registration in the sub-scanning direction can be corrected regardless of the absolute value of the inclination amount (1) and the inclination amount (2).

Note that, although the inclination amount is detected using the upper side in the image data in the present embodiment, it is not limited thereto, and the inclination amount may be detected using the lower side in the image data.

Next, an image reading process in the image processing apparatus 100 according to the present embodiment will be described.

Figure 10:
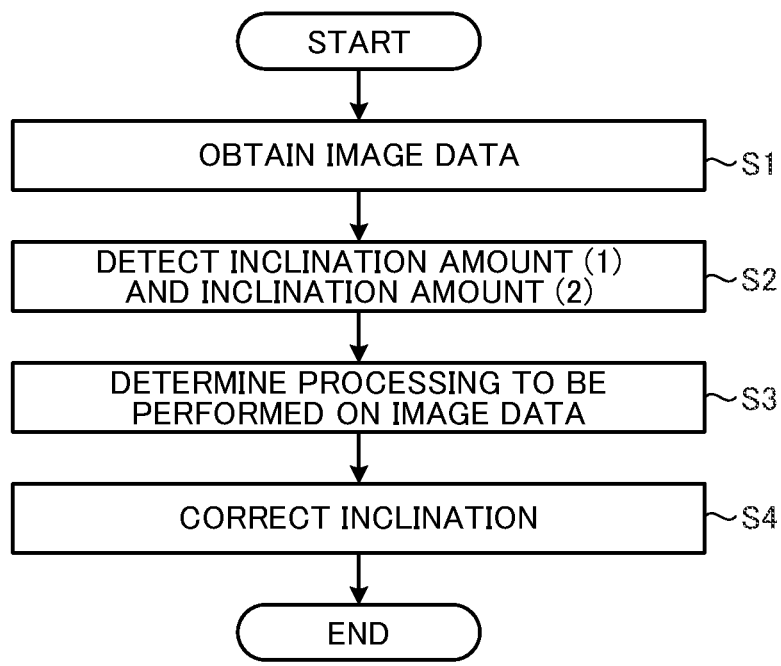
FIG. 10 is a flowchart schematically illustrating a flow of an image reading process.

Here, FIG. 10 is a flowchart schematically illustrating a flow of the image reading process. As illustrated in FIG. 10, when document conveyance is started by the ADF 102, the image processor 200 obtains image data obtained by the scanner 101 reading the document conveyed to, by the ADF 102, the slit glass 7 that is the reading position (step S1).

Subsequently, the image processor 200 (first inclination detecting unit 310 and second inclination detecting unit 320) detects the inclination amount (1) and the inclination amount (2) (step S2).

Subsequently, the image processor 200 (processing determination unit 330) determines a process to be performed on the image data from the inclination amount (1) and the inclination amount (2) calculated by the first inclination detecting unit 310 and the second inclination detecting unit 320 (step S3).

Subsequently, the image processor 200 (inclination correcting unit 340) executes the imaging process determined in step S3 to correct the inclination of the document in the image data, and outputs it to the subsequent stage as corrected image data (step S4).

In this manner, according to the present embodiment, a difference between the inclination amount detection results of the shadow edge and the document edge is detected at a specific position of the main scanning, whether the document has curl or a fold is determined from the difference value, and the skew and the registration correction amount are determined on the basis of the determination on whether or not to perform correction or the determination result of the detection accuracy. As a result, accuracy in electric skew correction can be improved as compared with the background art, and erroneous detection can be suppressed even in the case of a high-density document in which the document edge may not be detected.

Note that, although the processing determination unit 330 invariably detects the inclination amount with the first inclination detecting unit 310 and the second inclination detecting unit 320 in the present embodiment, it is not limited thereto.

Figure 11:
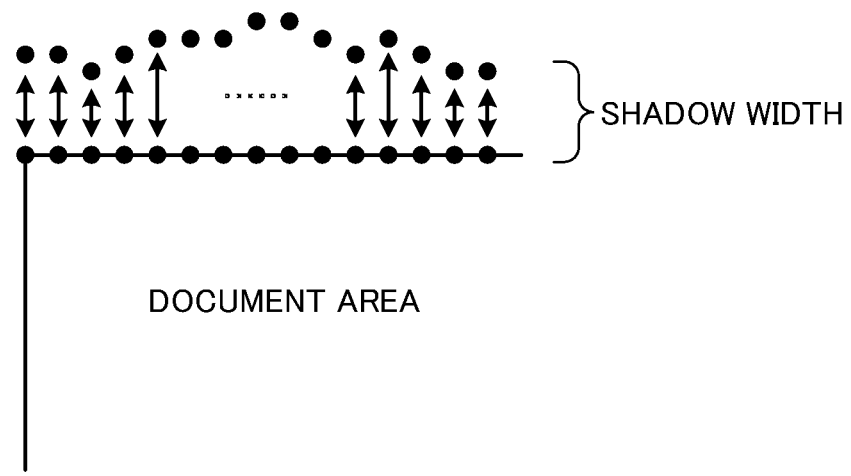
FIG. 11 is a diagram illustrating a case where the boundary between a document shadow and a document can be detected within a predetermined number of lines in the sub-scanning direction.
Figure 12:
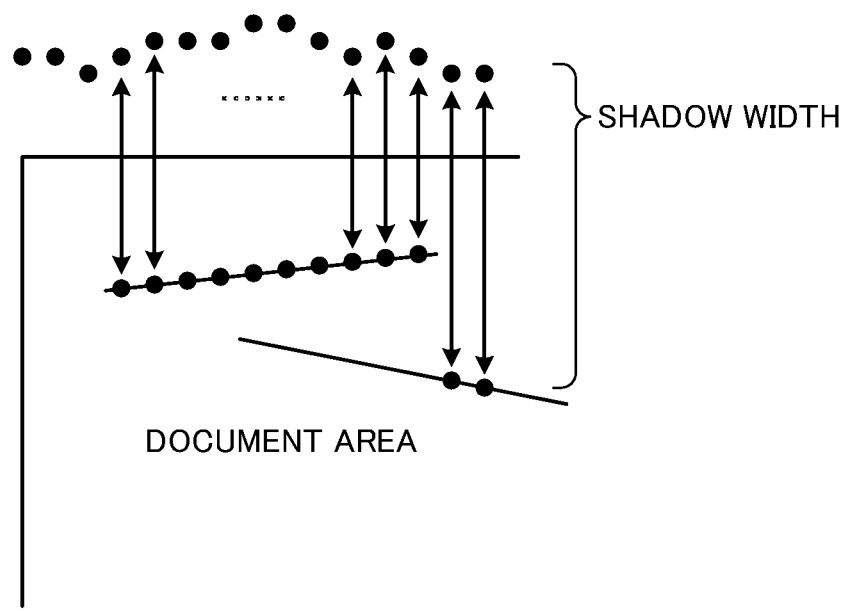
FIG. 12 is a diagram illustrating a case where the boundary between the document shadow and the document cannot be detected within the predetermined number of lines in the sub-scanning direction.

FIG. 11 is a diagram illustrating a case where the boundary between the document shadow and the document can be detected within a predetermined number of lines in the sub-scanning direction from the detection result of the boundary between the background member 92 and the document shadow. Meanwhile, FIG. 12 is a diagram illustrating a case where the boundary between the document shadow and the document cannot be detected within the predetermined number of lines in the sub-scanning direction from the detection result of the boundary between the background member 92 and the document shadow, and information in the document area is detected as an outline.

In a case where the density of the document is equal to or higher than the document shadow, the boundary between the document shadow and the document may not be detected. Specifically, as illustrated in FIG. 12, in a case where the boundary between the document shadow and the document cannot be detected, image information in the document area may be detected.

In view of the above, in a case where the boundary between the document shadow and the document is detected away from the detection result of the boundary between the background member 92 and the document shadow obtained by the first inclination detecting unit 310 by a predetermined number of lines or more in the sub-scanning direction, the second inclination detecting unit 320 may determine that it is not the document outline, and may not detect the inclination amount.

Then, in a case where the second inclination detecting unit 320 fails to detect the inclination amount, the processing determination unit 330 notifies the inclination correcting unit 340 of a command not to perform correction. Accordingly, erroneous correction can be suppressed in the case where the boundary between the document shadow and the document cannot be detected due to the document density and color.

Second Embodiment

Next, a second embodiment will be described.

The second embodiment is different from the first embodiment in that an inclination amount is detected using vertical sides. Hereinafter, in the descriptions of the second embodiment, descriptions of the same part as a part of the first embodiment will be omitted, and parts different from the first embodiment will be described.

Figure 13:
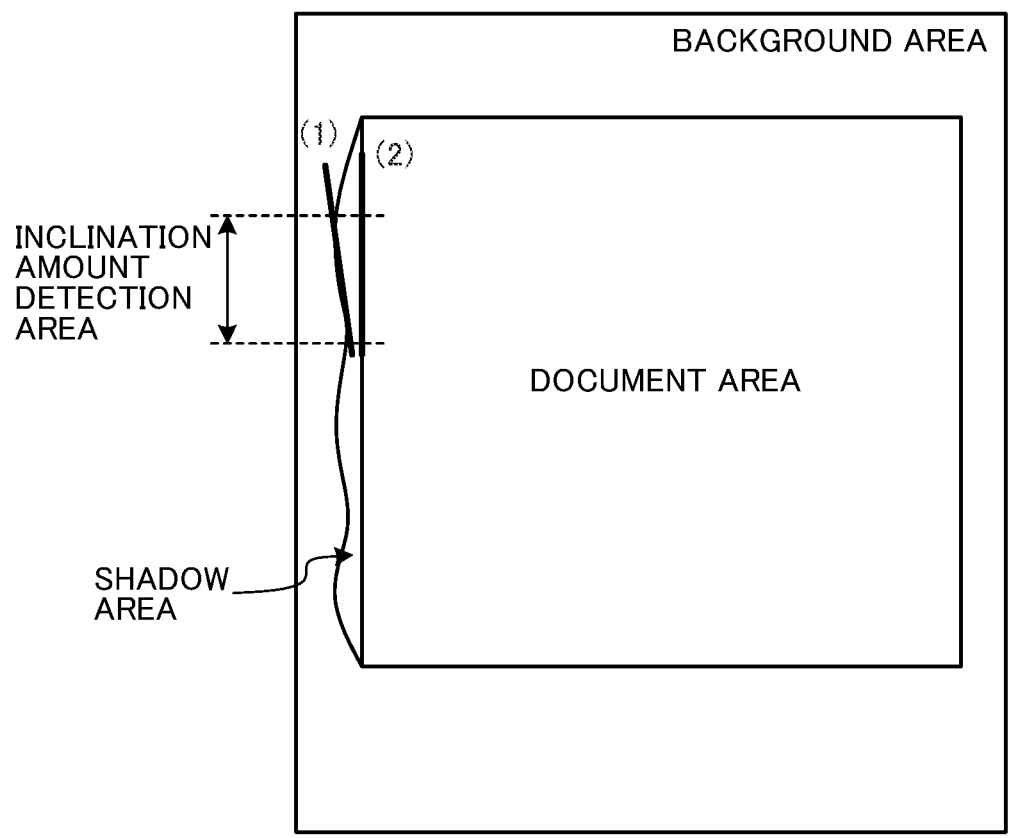
FIG. 13 is a diagram illustrating exemplary inclination amount detection from image data according to a second embodiment.

FIG. 13 is a diagram illustrating exemplary inclination amount detection from image data according to the second embodiment. As illustrated in FIG. 13, in the image data, a shadow area occurs at the boundary between a background area and a document area. Note that, although the shadow area is illustrated only on the left vertical side in FIG. 13, the shadow area occurs on the entire outline of the document.

A first inclination detecting unit 310 detects an inclination amount of the document (skew amount) from a result of detection of the boundary between a background member 92 and a document shadow at a part of or all of the outline of the document in the image data in the sub-scanning direction.

In the present embodiment, the first inclination detecting unit 310 detects the inclination amount (skew amount) of the document from the detection result of the boundary between the background member 92 and the document shadow on the left vertical side.

Further, a second inclination detecting unit 320 detects the inclination amount of the document from a result of detection of the boundary between the document shadow and the document at a part of or all of the outline of the document in the image data in the sub-scanning direction.

In the present embodiment, the second inclination detecting unit 320 detects the inclination amount of the document from the detection result of the boundary between the document shadow and the document on the left vertical side in the image data.

FIG. 13 illustrates an inclination amount detection result (1) of the first inclination detecting unit 310 and an inclination amount detection result (2) of the second inclination detecting unit 320 in the case where the width of the shadow area varies.

As illustrated in FIG. 13, the inclination amount detection result (1) of the first inclination detecting unit 310 shows that the distance between the document and the background member 92 varies in the sub-scanning direction (conveyance direction) of the document, whereby the shadow is not uniform in the sub-scanning direction of the document and variation in the shadow width occurs. Even in such a case, the inclination amount detection result (2) of the second inclination detecting unit 320 can detect an inclination amount close to the outline of the document although an error is included. Accordingly, by taking the absolute value of the inclination amount (1) and the inclination amount (2), for example, it becomes possible to detect whether there is variation such as curl and a fold at the edge of the document.

A processing determination unit 330 determines, for example, any one of the (exemplary process determination 1) to (exemplary process determination 3) described in the first embodiment, and an inclination correcting unit 340 executes the imaging process determined by the processing determination unit 330 to correct the inclination of the document in the image data, whereby an inclination amount correction function that does not perform erroneous correction can be provided for all documents.

Note that the inclination amount detection area can be set to any width in FIG. 13. Further, the position of the document area in the main-scanning direction can be detected from the inclination amount detection result (2) of the second inclination detecting unit 320.

Furthermore, registration in the main-scanning direction can be corrected regardless of the absolute value of the inclination amount (1) and the inclination amount (2).

Note that the inclination amount may be detected using the right vertical side instead of the left vertical side.

As described above, according to the present embodiment, in the case where stability of the outline in the sub-scanning direction is high due to the device configuration of a scanner 101, an inclination amount is detected only from the outline in the sub-scanning direction, whereby accuracy in detection can be improved. In addition, the outline in the sub-scanning direction is detected, whereby main scanning registration can be corrected with high accuracy.

Third Embodiment

Next, a third embodiment will be described.

The third embodiment is different from the first embodiment in that an inclination amount is detected using the upper side or the lower side, and also the inclination amount is detected using a vertical side. Hereinafter, in the descriptions of the third embodiment, descriptions of the same part as a part of the first embodiment will be omitted, and parts different from the first embodiment will be described.

Figure 14:
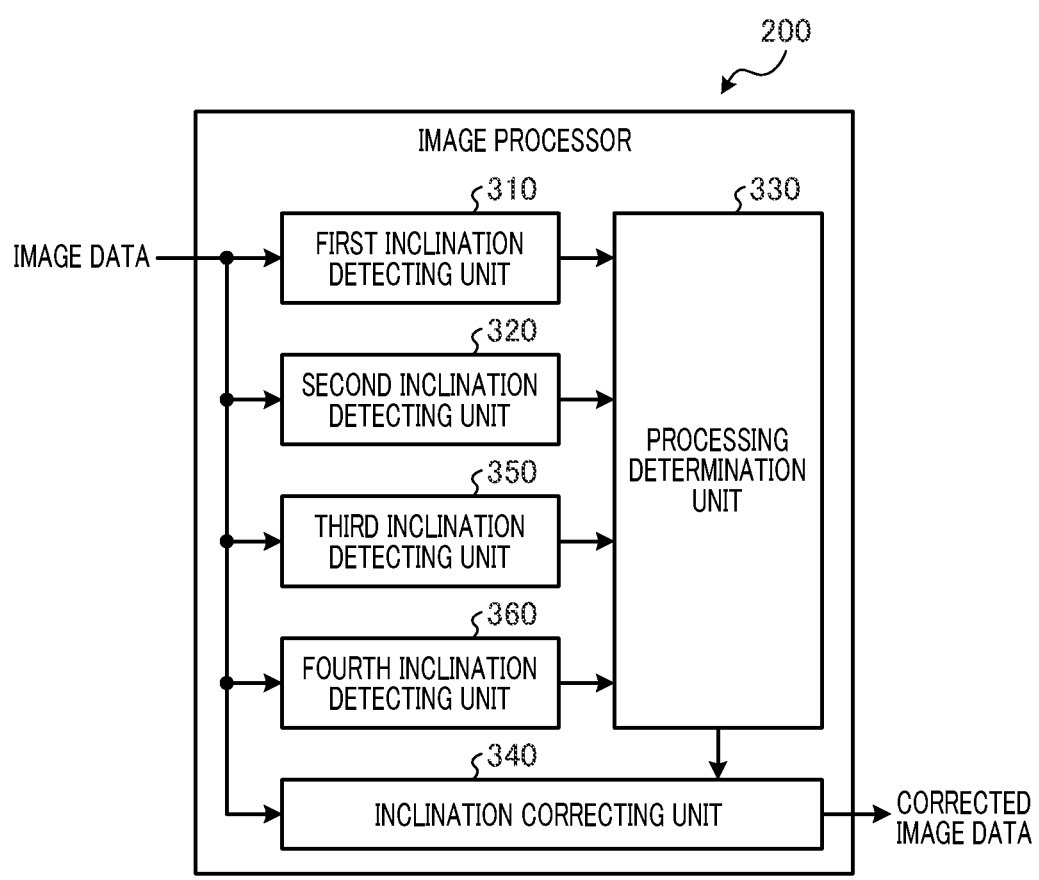
FIG. 14 is a block diagram illustrating functions of an image processor according to a third embodiment.

FIG. 14 is a block diagram illustrating functions of an image processor 200 according to the third embodiment. As illustrated in FIG. 14, the image processor 200 includes, in addition to an image generating unit 300, a first inclination detecting unit 310, a second inclination detecting unit 320, a processing determination unit 330, and an inclination correcting unit 340, a third inclination detecting unit 350 that functions as a first boundary detecting unit, and a fourth inclination detecting unit 360 that functions as a second boundary detecting unit. The third inclination detecting unit 350 and the fourth inclination detecting unit 360 are included in a controller ASIC 208. Note that the present disclosure is not limited thereto, and the third inclination detecting unit 350 and the fourth inclination detecting unit 360 may be implemented by a CPU 201 executing a program.

The first inclination detecting unit 310 detects the shadow boundary between a background member 92 and a document on the upper side in image data, and detects an inclination amount of the document from a result of the detection of the boundary.

The second inclination detecting unit 320 detects the boundary between a document shadow and the document on the upper side in the image data, and detects the inclination amount of the document from a result of the detection of the boundary.

The third inclination detecting unit 350 detects the shadow boundary between the background member 92 and the document on the left vertical side in the image data, and detects the inclination amount of the document from a result of the detection of the boundary.

The fourth inclination detecting unit 360 detects the boundary between the document shadow and the document on the left vertical side in the image data, and detects the inclination amount of the document from a result of the detection of the boundary.

Figure 15:
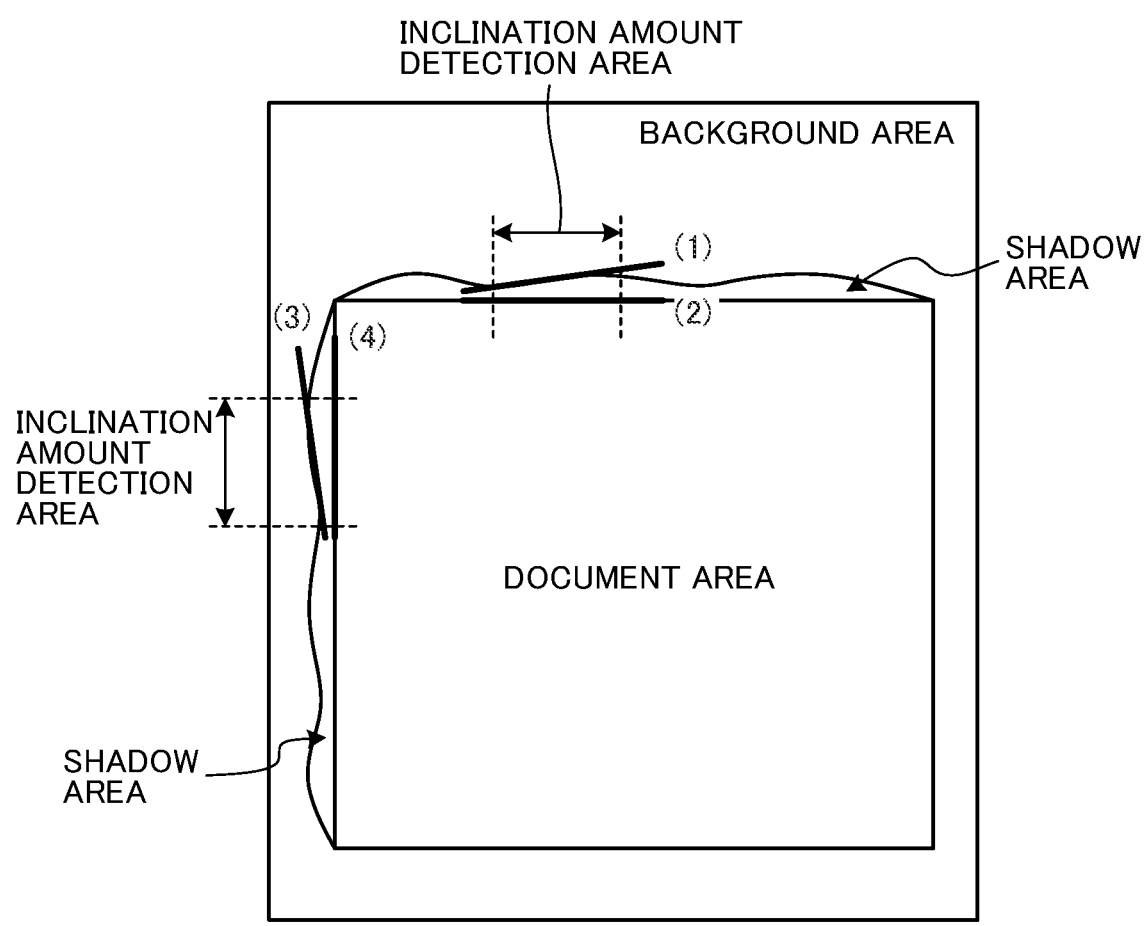
FIG. 15 is a diagram illustrating exemplary inclination amount detection from image data.

Here, FIG. 15 is a diagram illustrating exemplary inclination amount detection from the image data. As illustrated in FIG. 15, in the image data, a shadow area occurs at the boundary between the background area and the document area. Note that, although the shadow area is illustrated only on the two sides of the upper side and the left vertical side in FIG. 15, the shadow area occurs on the entire outline of the document.

FIG. 15 illustrates an inclination amount detection result (1) of the first inclination detecting unit 310, an inclination amount detection result (2) of the second inclination detecting unit 320, an inclination amount detection result (3) of the third inclination detecting unit 350, and an inclination amount detection result (4) of the fourth inclination detecting unit 360 in the case where the width of the shadow area varies.

As illustrated in FIG. 15, the inclination amount detection result (1) of the first inclination detecting unit 310 shows that the distance between the document and the background member 92 varies in the main-scanning direction of the document, whereby the shadow is not uniform in the main-scanning direction of the document and variation in the shadow width occurs. Even in such a case, the inclination amount detection result (2) of the second inclination detecting unit 320 can detect an inclination amount close to the outline of the document although an error is included. Accordingly, by taking the absolute value of the inclination amount (1) and the inclination amount (2), for example, it becomes possible to detect whether there is variation such as curl and a fold at the edge of the document.

In addition, as illustrated in FIG. 15, the inclination amount detection result (3) of the third inclination detecting unit 350 shows that the distance between the document and the background member 92 varies in the sub-scanning direction (conveyance direction) of the document, whereby the shadow is not uniform in the sub-scanning direction of the document and variation in the shadow width occurs. Even in such a case, the inclination amount detection result (4) of the fourth inclination detecting unit 360 can detect an inclination amount close to the outline of the document although an error is included. Accordingly, by taking the absolute value of the inclination amount (3) and the inclination amount (4), for example, it becomes possible to detect whether the document has variation such as curl and a fold.

The processing determination unit 330 determines a process to be performed on the image data from the inclination amount on the upper side in the image data calculated by the first inclination detecting unit 310 and the second inclination detecting unit 320 and the inclination amount on the left vertical side in the image data calculated by the third inclination detecting unit 350 and the fourth inclination detecting unit 360.

The inclination correcting unit 340 performs the image process determined by the processing determination unit 330 to correct the inclination of the document in the image data, and outputs it to the subsequent stage as corrected image data.

Here, exemplary determination of the process to be performed on the image data, which is determined by the processing determination unit 330, will be described as an example.

Exemplary Process Determination 4

For example, in a case where both of the absolute value of (1)-(2) and the absolute value of (3)-(4) are equal to or more than a predetermined value, the processing determination unit 330 notifies the inclination correcting unit 340 of a command not to perform correction. In this case, the inclination correcting unit 340 does not correct the inclination amount.

On the other hand, in a case where the absolute value of (1)-(2) is equal to or less than the predetermined value, the processing determination unit 330 notifies the inclination correcting unit 340 of a command to perform correction with the inclination amount detection result (2) of the second inclination detecting unit 320. In this case, the inclination correcting unit 340 performs correction with the inclination amount (2).

Furthermore, in a case where the absolute value of (3)-(4) is equal to or less than the predetermined value, the processing determination unit 330 notifies the inclination correcting unit 340 of a command to perform correction with the inclination amount detection result (4) of the fourth inclination detecting unit 360. In this case, the inclination correcting unit 340 performs correction with the inclination amount (4).

Furthermore, in a case where both of the absolute values of (1)-(2) and (3)-(4) are equal to or less than the predetermined value, for example, the processing determination unit 330 notifies the inclination correcting unit 340 of a command to perform correction with any of the following values.

Inclination amount detection result (2) of the second inclination detecting unit 320
Inclination amount detection result (4) of the fourth inclination detecting unit 360
Average value of the inclination amount detection result (2) of the second inclination detecting unit 320 and the inclination amount detection result (4) of the fourth inclination detecting unit 360

Note that, in the case where both of the absolute values of (1)-(2) and (3)-(4) are equal to or less than the predetermined value, the processing determination unit 330 may notify the inclination correcting unit 340 of a command to perform correction with a value calculated by another calculation method using (2) and (4).

As described above, it becomes possible to provide, for all documents, a function of correcting the inclination amount without performing erroneous correction.

Exemplary Process Determination 5

For example, regardless of the difference between (1)-(2) and (3)-(4), the processing determination unit 330 notifies the inclination correcting unit 340 of a command to perform correction with any of the following values.

Inclination amount detection result (2) of the second inclination detecting unit 320
Inclination amount detection result (4) of the fourth inclination detecting unit 360
Average value of the inclination amount detection result (2) of the second inclination detecting unit 320 and the inclination amount detection result (4) of the fourth inclination detecting unit 360

Note that the processing determination unit 330 may notify the inclination correcting unit 340 of a command to perform correction with a value calculated by another calculation method using (2) and (4).

Here, the purpose of obtaining the inclination amount detection result (1) of the first inclination detecting unit 310 and the purpose of obtaining the inclination amount detection result (3) of the third inclination detecting unit 350 are for not detecting information in the image area as the inclination amounts (2) and (4). In this case, outline information detected within a predetermined number of lines of the sub-scanning from the detection position of the inclination amount (1) is used to generate the inclination amount (2). In addition, outline information detected within a predetermined number of pixels of the main scanning from the detection position of the inclination amount (3) is used to generate the inclination amount (4).

As described above, it becomes possible to provide, for all documents, a function of correcting the inclination amount without performing erroneous correction.

Exemplary Process Determination 6

Although the detection result of the boundary between the document shadow and the document includes an error regardless of the state of the document, the outline can be detected accurately. However, in a case where the state of curl, a fold, or the like of the document is large, an error in the outline detection result of the document may be large. In view of the above, for example, by determining the correction amount from the difference (1)-(2) in FIG. 15 and the inclination amount (2), the processing determination unit 330 is made possible to perform correction with high accuracy even for a highly damaged document.

The following formula can be given as an exemplary arithmetic expression.

Correction amount 1=|inclination amount (1)−inclination amount (2)|×(1/α)+inclination amount (2) α=fixed value or coefficient determined from (1)-(2)

The correction amount is then determined from the difference (3)-(4) and the inclination amount (4) in FIG. 15.

The following formula can be given as an exemplary arithmetic expression.

Correction amount 2=|inclination amount (3)−inclination amount (4)|×(1/β)+inclination amount (4) β=fixed value or coefficient determined from (3)-(4)

For example, the processing determination unit 330 notifies the inclination correcting unit 340 of a command to perform correction with any of the following values.

Correction amount 1 of the inclination amount detection result of the second inclination detecting unit 320
Correction amount 2 of the inclination amount detection result of the fourth inclination detecting unit 360
Average value of the correction amount 1 of the inclination amount detection result of the second inclination detecting unit 320 and the correction value 2 of the inclination amount detection result of the fourth inclination detecting unit 360

Note that the processing determination unit 330 may notify the inclination correcting unit 340 of a command to perform correction with a value calculated by another calculation method using (1) to (4).

As described above, it becomes possible to provide, for all documents, a function of correcting the inclination amount without performing erroneous correction.

Note that the inclination amount detection area can be set to any width in FIG. 15.

Furthermore, the position of the document area in the sub-scanning direction can be detected from the inclination amount detection result (2) of the second inclination detecting unit 320.

As described above, registration in the sub-scanning direction can be corrected regardless of the absolute value of the inclination amount (1) and the inclination amount (2).

Further, the position of the document area in the main-scanning direction can be detected from the inclination amount detection result (4) of the fourth inclination detecting unit 360.

As described above, registration in the main-scanning direction can be corrected regardless of the absolute value of the inclination amount (3) and the inclination amount (4).

Note that, although the inclination amount is detected using the upper side in the image data in the present embodiment, it is not limited thereto, and the inclination amount may be detected using the lower side in the image data.

In addition, although the inclination amount is detected using the left vertical side in the image data in the present embodiment, it is not limited thereto, and the inclination amount may be detected using the right vertical side in the image data.

As described above, according to the present embodiment, in the case where stability of the outlines in both the main-scanning direction and the sub-scanning direction is high due to the device configuration of a scanner 101, an inclination amount is detected from both of the outlines, whereby accuracy in detection can be improved. In addition, the outline in the sub-scanning direction is detected, whereby main scanning registration can be corrected with high accuracy.

Fourth Embodiment

Next, a fourth embodiment will be described.

The fourth embodiment is different from the first embodiment in that a plurality of first inclination detecting units 310 and second inclination detecting units 320 are included. Hereinafter, in the descriptions of the fourth embodiment, descriptions of the same part as a part of the first embodiment will be omitted, and parts different from the first embodiment will be described.

Figure 16:
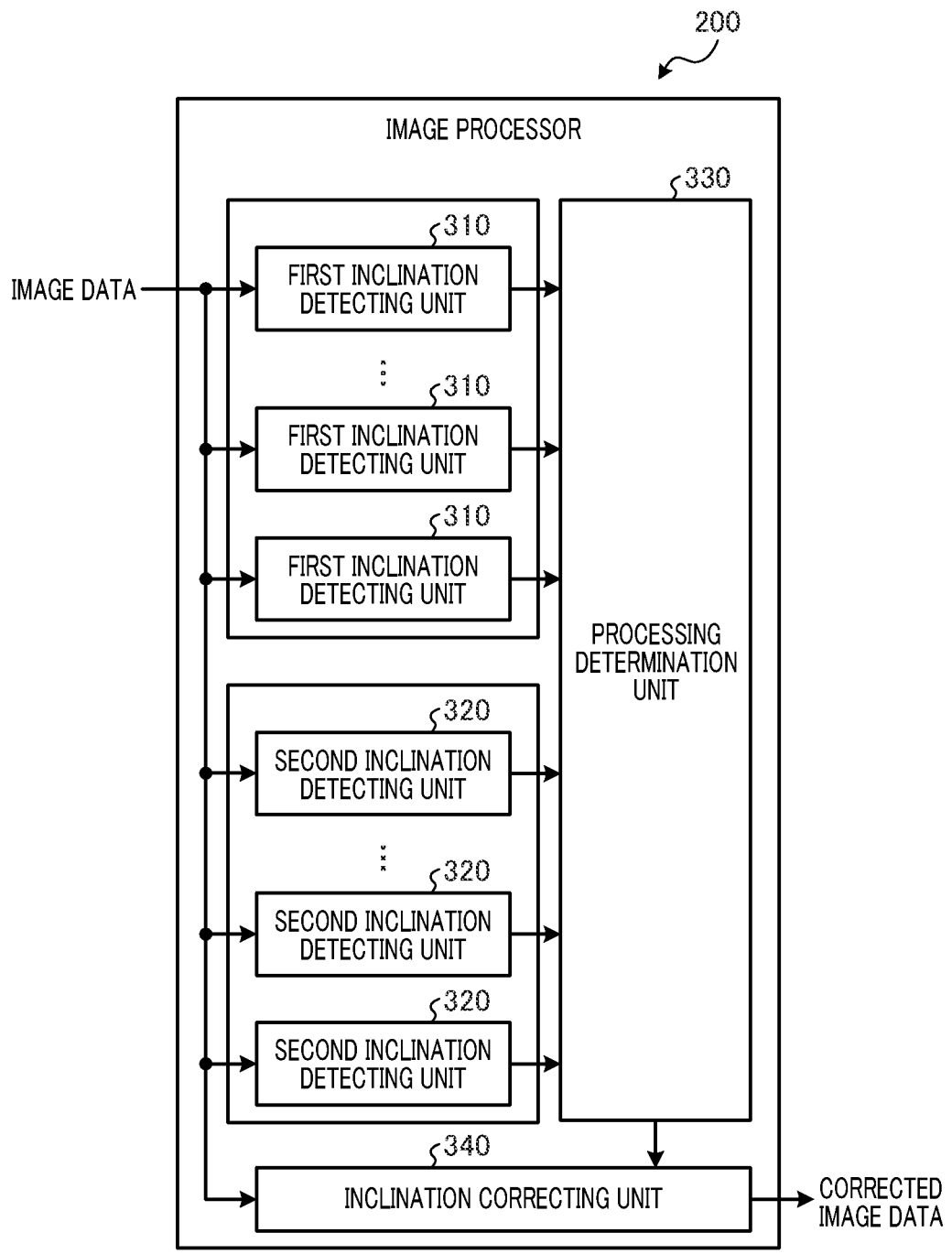
FIG. 16 is a block diagram illustrating functions of an image processor according to a fourth embodiment.

FIG. 16 is a block diagram illustrating functions of an image processor 200 according to the fourth embodiment. As illustrated in FIG. 16, the image processor 200 includes an image generating unit 300, a plurality of first inclination detecting units 310, a plurality of second inclination detecting units 320, a processing determination unit 330, and an inclination correcting unit 340. The first inclination detecting units 310 and the second inclination detecting units 320 are included in a controller ASIC 208. Note that the present disclosure is not limited thereto, and the first inclination detecting units 310 and the second inclination detecting units 320 may be implemented by a CPU 201 executing a program.

The processing determination unit 330 determines a process to be performed on image data from the inclination amount on the upper side in the image data calculated by the first inclination detecting units 310 and the second inclination detecting units 320.

For example, the processing determination unit 330 calculates a difference between the inclination amounts of the first inclination detecting unit 310 and the second inclination detecting unit 320 at the same position. Then, the processing determination unit 330 determines a process to be performed on the image data from a result of the position having the smallest difference among the differences at multiple points.

The inclination correcting unit 340 performs the image process determined by the processing determination unit 330 to correct the inclination of the document in the image data, and outputs it to the subsequent stage as corrected image data.

As described above, according to the present embodiment, determination is made from results of detection at multiple points on the document edge, whereby a difference caused by erroneous detection of the inclination amount can be minimized without information in the document being erroneously detected as the document edge.

Note that, although the inclination amount is detected using the upper side in the image data in the present embodiment, it is not limited thereto, and the inclination amount may be detected using the lower side in the image data.

In addition, although the inclination amount is detected using the upper side in the image data in the present embodiment, it is not limited thereto, and the inclination amount may be detected using either the right or left vertical side in the image data.

Fifth Embodiment

Next, a fifth embodiment will be described.

The fifth embodiment is different from the third embodiment in that a plurality of first inclination detecting units 310 and second inclination detecting units 320 are included as well as a plurality of third inclination detecting units 350 and fourth inclination detecting units 360 are included. Hereinafter, in the descriptions of the fifth embodiment, descriptions of the same part as a part of the third embodiment will be omitted, and parts different from the third embodiment will be described.

Figure 17:
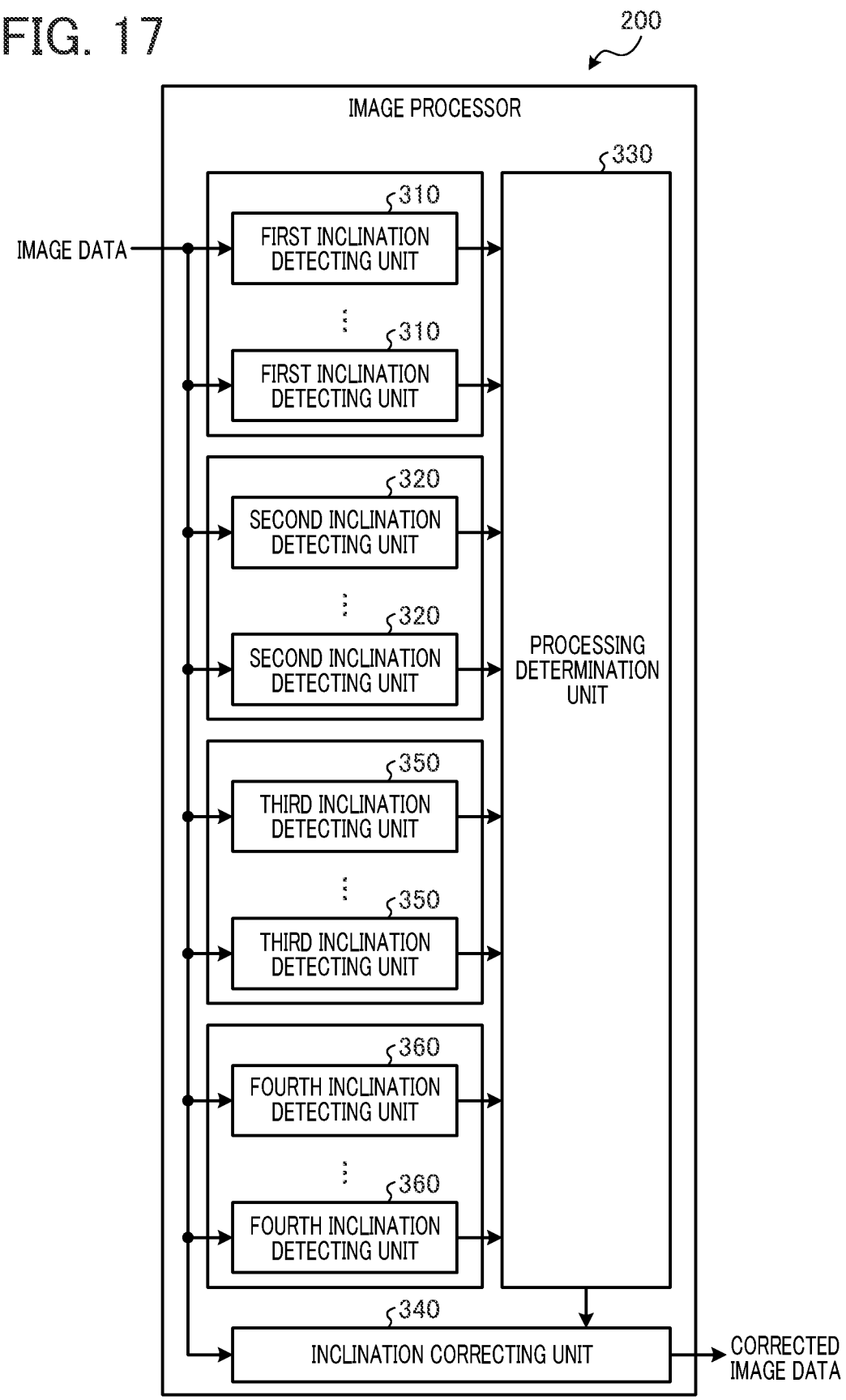
FIG. 17 is a block diagram illustrating functions of an image processor according to a fifth embodiment.

FIG. 17 is a block diagram illustrating functions of an image processor 200 according to the fifth embodiment. As illustrated in FIG. 17, the image processor 200 includes, in addition to an image generating unit 300, a plurality of first inclination detecting units 310, a plurality of second inclination detecting units 320, a processing determination unit 330, and an inclination correcting unit 340, a plurality of third inclination detecting units 350, and a plurality of fourth inclination detecting units 360. The first inclination detecting units 310, the second inclination detecting units 320, the third inclination detecting units 350, and the fourth inclination detecting units 360 are included in a controller ASIC 208. Note that the present disclosure is not limited thereto, and the first inclination detecting units 310, the second inclination detecting units 320, the third inclination detecting units 350, and the fourth inclination detecting units 360 may be implemented by a CPU 201 executing a program.

The first inclination detecting units 310 detect the shadow boundary between a background member 92 and a document on the upper side in image data, and detect an inclination amount of the document from a result of the detection of the boundary.

The second inclination detecting units 320 detect the boundary between a document shadow and the document on the upper side in the image data, and detect the inclination amount of the document from a result of the detection of the boundary.

The third inclination detecting units 350 detect the shadow boundary between the background member 92 and the document on the left vertical side in the image data, and detect the inclination amount of the document from a result of the detection of the boundary.

The fourth inclination detecting units 360 detect the boundary between the document shadow and the document on the left vertical side in the image data, and detect the inclination amount of the document from a result of the detection of the boundary.

Figure 18:
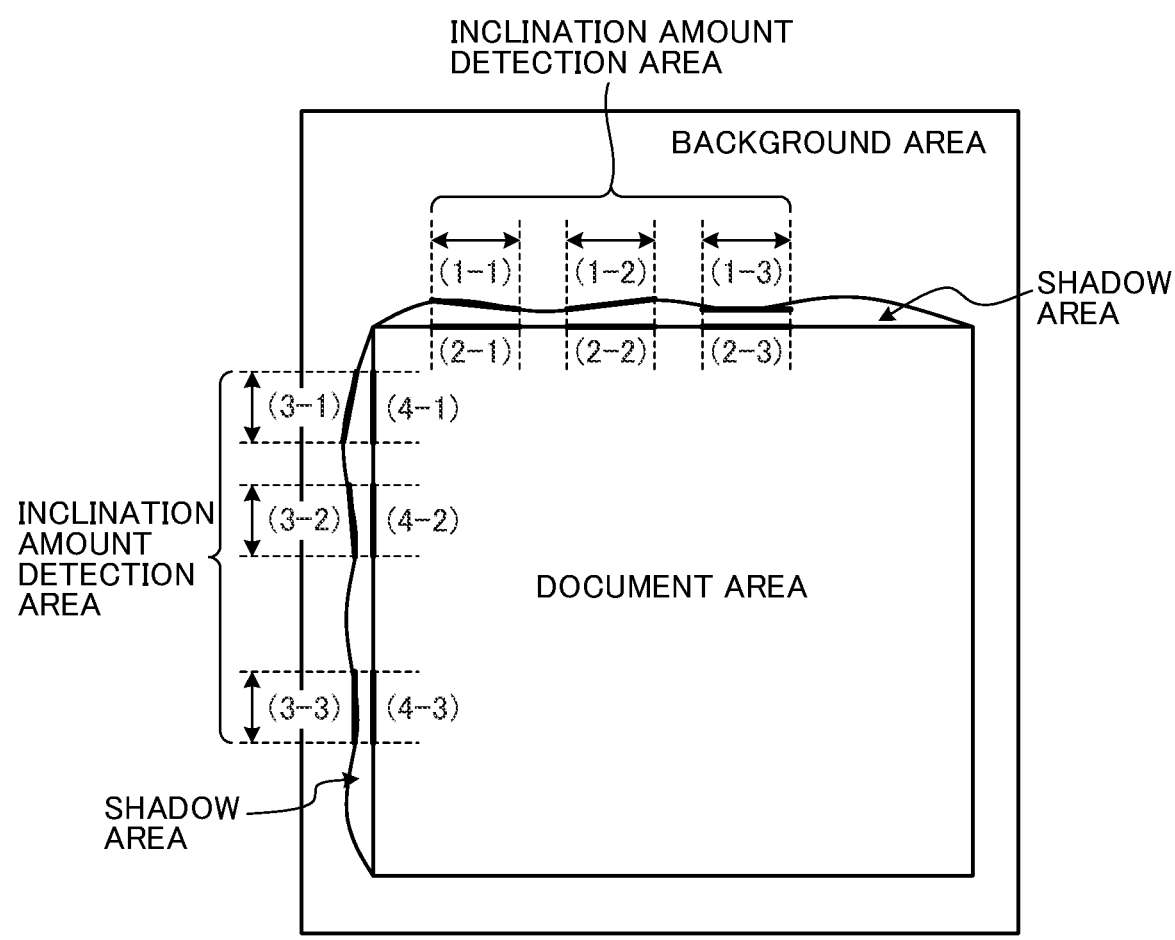
FIG. 18 is a diagram illustrating exemplary inclination amount detection from image data.

Here, FIG. 18 is a diagram illustrating exemplary inclination amount detection from the image data. As illustrated in FIG. 18, in the image data, a shadow area occurs at the boundary between the background area and the document area. Note that, although the shadow area is illustrated only on the two sides of the upper side and the left vertical side in FIG. 18, the shadow area occurs on the entire outline of the document.

FIG. 18 illustrates inclination amount detection results (1-1) to (1-3) of the first inclination detecting units 310 and inclination amount detection results (2-1) to (2-3) of the second inclination detecting units 320 in the case where the width of the shadow area on the upper side varies, and inclination amount detection results (3-1) to (3-3) of the third inclination detecting units 350 and inclination amount detection results (4-1) to (4-3) of the fourth inclination detecting units 360 in the case where the width of the shadow area on the left vertical side varies.

As illustrated in FIG. 18, the inclination amount detection results (1-1) to (1-3) of the first inclination detecting units 310 show that the distance between the document and the background member 92 varies in the main-scanning direction of the document, whereby the shadow is not uniform in the main-scanning direction of the document and variation in the shadow width occurs. Even in such a case, the inclination amount detection results (2-1) to (2-3) of the second inclination detecting units 320 can detect an inclination amount close to the outline of the document although an error is included. In addition, even in a case where the document is damaged, there is a spot at which an erroneous detection amount of the first inclination detecting unit 310 is small depending on the main scanning position. In view of the above, for example, by taking the absolute value of the inclination amounts (1-1)-(2-1), the absolute value of the inclination amounts (1-2)-(2-2), and the absolute value of the inclination amounts (1-3)-(2-3), and determining a process from a result of the position having the smallest difference, it becomes possible to reduce an error in detection even in the case where the document has variation such as curl, a fold, or the like.

Furthermore, as illustrated in FIG. 18, the inclination amount detection results (3-1) to (3-3) of the third inclination detecting units 350 show that the distance between the document and the background member 92 varies in the sub-scanning direction of the document, whereby the shadow is not uniform in the sub-scanning direction of the document and variation in the shadow width occurs. Even in such a case, the inclination amount detection results (4-1) to (4-3) of the fourth inclination detecting units 360 can detect an inclination amount close to the outline of the document although an error is included. In addition, even in a case where the document is damaged, there is a spot at which an erroneous detection amount of the third inclination detecting unit 350 is small depending on the sub scanning position. In view of the above, for example, by taking the absolute value of the inclination amounts (3-1)-(4-1), the absolute value of the inclination amounts (3-2)-(4-2), and the absolute value of the inclination amounts (3-3)-(4-3), and determining a process from a result of the position having the smallest difference, it becomes possible to reduce an error in detection even in the case where the document has variation such as curl, a fold, or the like.

The processing determination unit 330 determines a process to be performed on the image data from the inclination amounts on the upper side and the left vertical side in the image data, which are calculated by the first inclination detecting units 310 and the second inclination detecting units 320, and the third inclination detecting units 350 and the fourth inclination detecting units 360.

For example, the processing determination unit 330 calculates a difference between the inclination amounts of the first inclination detecting unit 310 and the second inclination detecting unit 320 at the same position. The processing determination unit 330 further calculates a difference between the inclination amounts of the third inclination detecting unit 350 and the fourth inclination detecting unit 360 at the same position. Then, the processing determination unit 330 determines a process to be performed on the image data from a result of the position having the smallest difference among the differences at multiple points.

The inclination correcting unit 340 performs the image process determined by the processing determination unit 330 to correct the inclination of the document in the image data, and outputs it to the subsequent stage as corrected image data.

Here, exemplary determination of the process to be performed on the image data, which is determined by the processing determination unit 330, will be described as an example.

Exemplary Process Determination 7

For example, in a case where both of the smallest difference value of the absolute values of (1)-(2) at multiple points and the smallest difference value of the absolute values of (3)-(4) at multiple points have a difference equal to or more than a predetermined value, the processing determination unit 330 notifies the inclination correcting unit 340 of a command not to perform correction. In this case, the inclination correcting unit 340 does not correct the inclination amount.

In addition, in a case where only the smallest difference value of the absolute values of (1)-(2) at multiple points has a difference equal to or more than the predetermined value, the processing determination unit 330 notifies the inclination correcting unit 340 of a command to perform correction with an inclination amount detection result (2-*) at the position having the smallest difference value. Note that "*" represents any one of 1 to 3 (the same applies hereinafter). In this case, the inclination correcting unit 340 performs correction with the inclination amount (2-*).

In addition, in a case where only the smallest difference value of the absolute values of (3)-(4) at multiple points has a difference equal to or more than the predetermined value, the processing determination unit 330 notifies the inclination correcting unit 340 of a command to perform correction with an inclination amount detection result (4-*) at the position having the smallest difference value. In this case, the inclination correcting unit 340 performs correction with the inclination amount (4-*).

Meanwhile, in a case where both of the smallest difference value of the absolute values of (1)-(2) at multiple points and the smallest difference value of the absolute values of (3)-(4) at multiple points have a difference equal to or less than the predetermined value, for example, the processing determination unit 330 notifies the inclination correcting unit 340 of a command to perform correction with any of the following values.

Inclination amount detection result (2-*) at the position where the difference value of the second inclination detecting unit 320 is the smallest Inclination amount detection result (4-*) at the position where the difference value of the fourth inclination detecting unit 360 is the smallest Average value of the inclination amount detection result (2-*) at the position where the difference value of the second inclination detecting unit 320 is the smallest and the inclination amount detection result (4-*) at the position where the difference value of the fourth inclination detecting unit 360 is the smallest Note that, in the case where both of the absolute values of (1)-(2) at multiple points and the absolute values of (3)-(4) at multiple points are equal to or less than the predetermined value, the processing determination unit 330 may notify the inclination correcting unit 340 of a command to perform correction with a value calculated by another calculation method using (2-*) and (4-*).

As described above, it becomes possible to provide, for all documents, a function of correcting the inclination amount without performing erroneous correction.

Exemplary Process Determination 8

For example, the processing determination unit 330 determines the position of the smallest difference value of the absolute values of (1)-(2) at multiple points and (3)-(4) at multiple points, and notifies the inclination correcting unit 340 of a command to perform correction with any of the following values.

Inclination amount detection result (2-*) at the position where the difference value of the second inclination detecting unit 320 is the smallest Inclination amount detection result (4-*) at the position where the difference value of the fourth inclination detecting unit 360 is the smallest Average value of the inclination amount detection result (2-*) at the position where the difference value of the second inclination detecting unit 320 is the smallest and the inclination amount detection result (4-*) at the position where the difference value of the fourth inclination detecting unit 360 is the smallest Note that, the processing determination unit 330 may determine the position of the smallest difference value of the absolute values of (1)-(2) at multiple points and (3)-(4) at multiple points, and may notify the inclination correcting unit 340 of a command to perform correction with a value calculated by another calculation method using (2-*) and (4-*).

As described above, it becomes possible to provide, for all documents, a function of correcting the inclination amount without performing erroneous correction.

Exemplary Process Determination 9

Although the detection result of the boundary between the document shadow and the document includes an error regardless of the state of the document, the outline can be detected accurately. However, in a case where the state of curl, a fold, or the like of the document is large, an error in the outline detection result of the document may be large. In view of the above, for example, by determining the correction amount from the difference (1-*)-(2-*) at the position of the smallest difference value in FIG. 18 and the inclination amount (2-*), the processing determination unit 330 is made possible to perform correction with high accuracy even for a highly damaged document.

The following formula can be given as an exemplary arithmetic expression.

Correction amount 1=|inclination amount (1-*)−inclination amount (2-*)|×(1/α)+inclination amount (2-*) α=fixed value or coefficient determined from (1-*)-(2-*)

The correction amount is then determined from the inclination amount (4-*) and the difference (3-*)-(4-*) at the position of the smallest difference value in FIG. 18.

The following formula can be given as an exemplary arithmetic expression.

Correction amount 2=|inclination amount (3-*)−inclination amount (4-*)|×(1/β)+inclination amount (4-*) β=fixed value or coefficient determined from (3-*)-(4-*)

For example, the processing determination unit 330 notifies the inclination correcting unit 340 of a command to perform correction with any of the following values.

Inclination amount detection result (2-*) at the position where the difference value of the second inclination detecting unit 320 is the smallest Inclination amount detection result (4-*) at the position where the difference value of the fourth inclination detecting unit 360 is the smallest Average value of the inclination amount detection result (2-*) at the position where the difference value of the second inclination detecting unit 320 is the smallest and the inclination amount detection result (4-*) at the position where the difference value of the fourth inclination detecting unit 360 is the smallest Note that the processing determination unit 330 may notify the inclination correcting unit 340 of a command to perform correction with a value calculated by another calculation method using (1) to (4).

As described above, it becomes possible to provide, for all documents, a function of correcting the inclination amount without performing erroneous correction.

Note that the inclination amount detection area can be set to any width in FIG. 18.

Note that, although the inclination amount is detected using the upper side in the image data in the present embodiment, it is not limited thereto, and the inclination amount may be detected using the lower side in the image data.

In addition, although the inclination amount is detected using the left vertical side in the image data in the present embodiment, it is not limited thereto, and the inclination amount may be detected using the right vertical side in the image data.

As described above, according to the present embodiment, determination is made from results of detection at multiple points on the document edge, whereby a difference caused by erroneous detection of the inclination amount can be minimized without information in the document being erroneously detected as the document edge.

Note that, although the scanner 101, the ADF 102, and the image processor 200 have been used as the inclination detecting device and inclination detection of an object to be inspected (document) at the time of conveyance has been described in the respective embodiments described above, the present disclosure is no limited thereto. For example, the inclination detecting device according to each of the embodiments can be applied to inclination detection of an object to be inspected of a factory automation (FA) inspection apparatus.

Furthermore, although an object to be detected (document) is conveyed and an image is obtained by the fixed imaging device 28 in each of the embodiments described above, in an opposite manner, the object to be detected (document) in a stopped state may be moved by the imaging device 28 to detect the inclination of the object to be detected (document).

Note that, although the exemplary case where the image processing apparatus according to the present disclosure is applied to a multifunction peripheral having at least two functions of the copy function, printer function, scanner function, and facsimile function has been described in each of the embodiments described above, it can be applied to any image processing apparatus such as a copier, printer, scanner, and facsimile device.

While embodiments of the present disclosure have been described above, the specific configuration of each part, the contents of processing, the data format, and the like are not limited to those described in the embodiments. It goes without saying that the configurations of the embodiments described above can be implemented in any combination as long as they do not contradict each other.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An inclination detecting device comprising:
processing circuitry configured to:
   detect, in image information that is an image of an object imaged by an imaging device at an imaging position at a background, a first boundary between the background and a shadow of the object;
   detect a second boundary between the object and the shadow of the object in the image information; and
   detect an inclination of the object in the image information from the first boundary and the second boundary detected by the processing circuitry,
wherein the processing circuitry detects the first boundary from a part or all of an outline of the object in a main-scanning direction and detects an inclination amount of the object from a detection result of the first boundary,
wherein the processing circuitry detects the second boundary from a part or all of the outline of the object in the main-scanning direction and detects an inclination amount of the object from a detection result of the second boundary,
wherein the processing circuitry determines processing to be performed on the image information from the inclination amounts detected from the first boundary and the second boundary,
wherein the processing circuitry includes:
a plurality of first boundary detecting circuitries; and
a plurality of second boundary detecting circuitries,
   wherein the processing circuitry determines the processing to be performed on the image information from the inclination amounts of the object detected from the first boundary and the second boundary, respectively, detected by the plurality of first boundary detecting circuitries and the plurality of second boundary detecting circuitries.

2. A reading device comprising:
an imaging device configured to image an object at an imaging position at a background; and
processing circuitry configured to:
   detect, in image information that is an image of the object imaged by the imaging device, a first boundary between the background and a shadow of the object;
   detect a second boundary between the object and the shadow of the object in the image information; and
   detect an inclination of the object in the image information from the first boundary and the second boundary detected by the processing circuitry,
wherein the processing circuitry detects the first boundary from a part or all of an outline of the object in a main-scanning direction and detects an inclination amount of the object from a detection result of the first boundary,
wherein the processing circuitry detects the second boundary from a part or all of the outline of the object in the main-scanning direction and detects an inclination amount of the object from a detection result of the second boundary,
wherein the processing circuitry determines processing to be performed on the image information from the inclination amounts detected from the first boundary and the second boundary,
wherein the processing circuitry includes:
a plurality of first boundary detecting circuitries; and
a plurality of second boundary detecting circuitries,
   wherein the processing circuitry determines the processing to be performed on the image information from the inclination amounts of the object detected from the first boundary and the second boundary, respectively, detected by the plurality of first boundary detecting circuitries and the plurality of second boundary detecting circuitries.

3. The reading device according to claim 2,
wherein the processing circuitry corrects a detected inclination of the object in accordance with the processing determined to be performed on the image information,
wherein, in a case where a difference between the inclination amount detected from the first boundary and the inclination amount detected from the second boundary is larger than a predetermined value, the processing circuitry issues a command not to perform correction of the inclination of the object.

4. The reading device according to claim 2,
wherein the processing circuitry corrects a detected inclination of the object in accordance with the processing determined to be performed on the image information,
wherein, regardless of a difference between the inclination amount detected from the first boundary and the inclination amount detected from the second boundary, the processing circuitry issues a command to perform correction with the inclination amount detected from the second boundary.

5. The reading device according to claim 2,
wherein the processing circuitry corrects a detected inclination of the object in accordance with the processing determined to be performed on the image information,
wherein the processing circuitry determines an inclination correction amount from the inclination amount detected from the second boundary and a difference value of the inclination amount detected from the first boundary and the inclination amount detected from the second boundary.

6. The reading device according to claim 2,
wherein the object is a document,
wherein in a case where a boundary between the document and a shadow of the document is detected at a predetermined number of lines or more away in a sub-scanning direction from a detection result of a boundary between the background and the shadow of the document, the processing circuitry does not perform another detection on the boundary between the document and the shadow of the document.

7. The reading device according to claim 2,
wherein the processing circuitry corrects a detected inclination of the object in accordance with the processing determined to be performed on the image information,
wherein, in a case where the processing circuitry fails to detect the second boundary, the processing circuitry issues a command not to perform correction of the inclination of the object.

8. The reading device according to claim 2,
wherein the processing circuitry detects the first boundary and the second boundary of the object in a boundary detection area set according to a size of the object.

9. An image processing apparatus comprising:
the reading device according to claim 2; and
an image forming device configured to form an image on basis of the image information read by the reading device.

10. A method of detecting an inclination, the method comprising:
first detecting, in image information that is an image of an object imaged by an imaging device at an imaging position at a background, a first boundary between the background and a shadow of the object;
second detecting a second boundary between the object and the shadow of the object in the image information; and
detecting an inclination of the object in the image information from the first boundary detected by the first detecting and the second boundary detected by the second detecting,
wherein the first detecting detects the first boundary from a part or all of an outline of the object in a main-scanning direction and detects an inclination amount of the object from a detection result of the first boundary,
wherein the second detecting detects the second boundary from a part or all of the outline of the object in the main-scanning direction and detects an inclination amount of the object from a detection result of the second boundary,
the method further comprising determining processing to be performed on the image information from the inclination amounts detected from the first boundary and the second boundary,
the method further comprising determining the processing to be performed on the image information from the inclination amounts of the object detected from the first boundary and the second boundary.

11. The reading device according to claim 2, wherein the detect an inclination of the object comprises:
calculating a difference between the first boundary and the second boundary.

12. The reading device according to claim 2, wherein the detect an inclination of the object comprises:
calculating an absolute value of a difference between the first boundary and the second boundary.

13. The reading device according to claim 2, wherein the processing circuitry is further configured to:
correct the image information using the inclination which has been detected.

14. The inclination detecting device according to claim 1, wherein the processing circuitry is further configured to:
correct the image information using the inclination which has been detected.

15. The method according to claim 10, further comprising:
correcting the image information using the inclination which has been detected.

* * * * *